United States Patent
Tobiason

(10) Patent No.: US 10,648,838 B2
(45) Date of Patent: *May 12, 2020

(54) CONTAMINATION AND DEFECT RESISTANT ROTARY OPTICAL ENCODER CONFIGURATION INCLUDING A ROTARY SCALE WITH YAWED SCALE GRATING BARS AND STRUCTURED ILLUMINATION GENERATING ARRANGEMENT WITH A BEAM DEFLECTOR CONFIGURATION

(71) Applicant: Mitutoyo Corporation, Kanagawa-ken (JP)

(72) Inventor: Joseph Daniel Tobiason, Bothell, WA (US)

(73) Assignee: Mitutoyo Corporation, Kanagawa-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/413,521

(22) Filed: May 15, 2019

(65) Prior Publication Data

US 2019/0265077 A1 Aug. 29, 2019

Related U.S. Application Data

(63) Continuation-in-part of application No. 16/146,617, filed on Sep. 28, 2018, which is a continuation-in-part
(Continued)

(51) Int. Cl.
*G01D 5/38* (2006.01)
*G01D 5/347* (2006.01)

(52) U.S. Cl.
CPC ....... *G01D 5/34707* (2013.01); *G01D 5/3473* (2013.01); *G01D 5/38* (2013.01)

(58) Field of Classification Search
CPC .. G01D 5/34715; G01D 5/24438; G01D 5/38; G01D 5/3473; G01D 5/34707; G01S 3/7835
(Continued)

(56) References Cited

U.S. PATENT DOCUMENTS 3,882,482 A 5/1975 Green et al.
4,109,389 A 8/1978 Balcom et al.
(Continued)

FOREIGN PATENT DOCUMENTS

EP 2 367 058 A1 9/2011
EP 2 562 568 A1 2/2013
JP 2003-65803 A 3/2003

OTHER PUBLICATIONS

Canon, "Laser Rotary Encoder," Product Data Sheet, New LRE Catalog corrected 1117 2012, 2012, 12 pages.
(Continued)

*Primary Examiner* — Que Tan Le
(74) *Attorney, Agent, or Firm* — Seed IP Law Group LLP

(57) ABSTRACT

An optical encoder configuration comprises a cylindrical or planar rotary scale including yawed grating bars, an illumination source, a structured illumination generating arrangement (SIGA) and a detector arrangement including a photodetector. The SIGA is configured to input source light to a first illumination region on the rotary scale which diffracts light to a beam deflector configuration which transmits the diffracted light in a form that provides a particular fringe pattern proximate to a second illumination region on the scale. The scale filters and outputs that light to form a detector fringe pattern of intensity bands that are long along the rotary measuring direction and relatively narrow and periodic along a detected fringe motion direction (DFMD) transverse to the rotary measuring direction. The photodetector is configured to detect a position of the intensity bands
(Continued)

as a function of rotary scale displacement and provide corresponding displacement or position signals.

19 Claims, 21 Drawing Sheets

Related U.S. Application Data of application No. 15/942,135, filed on Mar. 30, 2018, now Pat. No. 10,295,648, which is a continuation-in-part of application No. 15/858,218, filed on Dec. 29, 2017, now Pat. No. 10,302,466, which is a continuation-in-part of application No. 15/702,520, filed on Sep. 12, 2017, now Pat. No. 10,295,378, which is a continuation-in-part of application No. 15/637,750, filed on Jun. 29, 2017, now Pat. No. 10,168,189.

(58) Field of Classification Search
USPC .............................................. 250/231.13, 216
See application file for complete search history.

(56) References Cited

U.S. PATENT DOCUMENTS

| | | |
|---|---|---|
| 4,414,754 A | 11/1983 | Lapeyre |
| 4,964,727 A | 10/1990 | Huggins |
| 5,010,655 A | 4/1991 | Rieder et al. |
| 5,073,710 A * | 12/1991 | Takagi ................ G01D 5/38 250/231.14 |
| 5,237,391 A | 8/1993 | Huggins |
| 5,239,178 A | 8/1993 | Derndinger et al. |
| 5,279,044 A | 1/1994 | Bremer |
| 5,442,166 A | 8/1995 | Hollmann |
| 5,773,820 A | 6/1998 | Osajda et al. |
| 5,774,219 A | 6/1998 | Matsuura |
| 5,886,519 A | 3/1999 | Masreliez et al. |
| 5,965,879 A | 10/1999 | Leviton |
| 7,471,397 B2 | 12/2008 | Holzapfel |
| 7,710,578 B2 | 5/2010 | Sändig et al. |
| 8,345,259 B2 | 1/2013 | Parriaux et al. |
| 8,493,572 B2 | 7/2013 | Milvich |
| 8,941,052 B2 | 1/2015 | Xie et al. |
| 9,018,578 B2 | 4/2015 | Tobiason et al. |
| 9,029,757 B2 | 5/2015 | Tobiason |
| 9,080,899 B2 | 7/2015 | Tobiason |

OTHER PUBLICATIONS

Tonchev et al., "Cylindrical Grating Projection by Single-Shot Normal Exposure of a Radial Phase Mask," *IEEE Photonics Journal* 4(4):1170-1177, 2012 (10 pages).

Wu et al., "Common-path laser planar encoder," *Optics Express* 21(16):18872-18883, 2013.

* cited by examiner

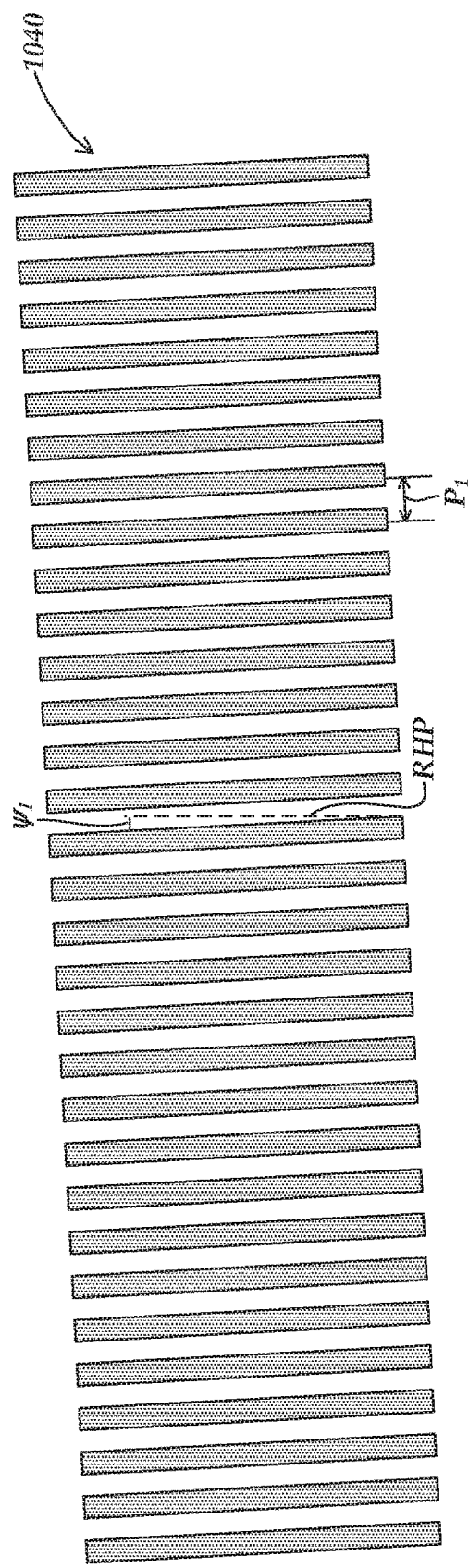
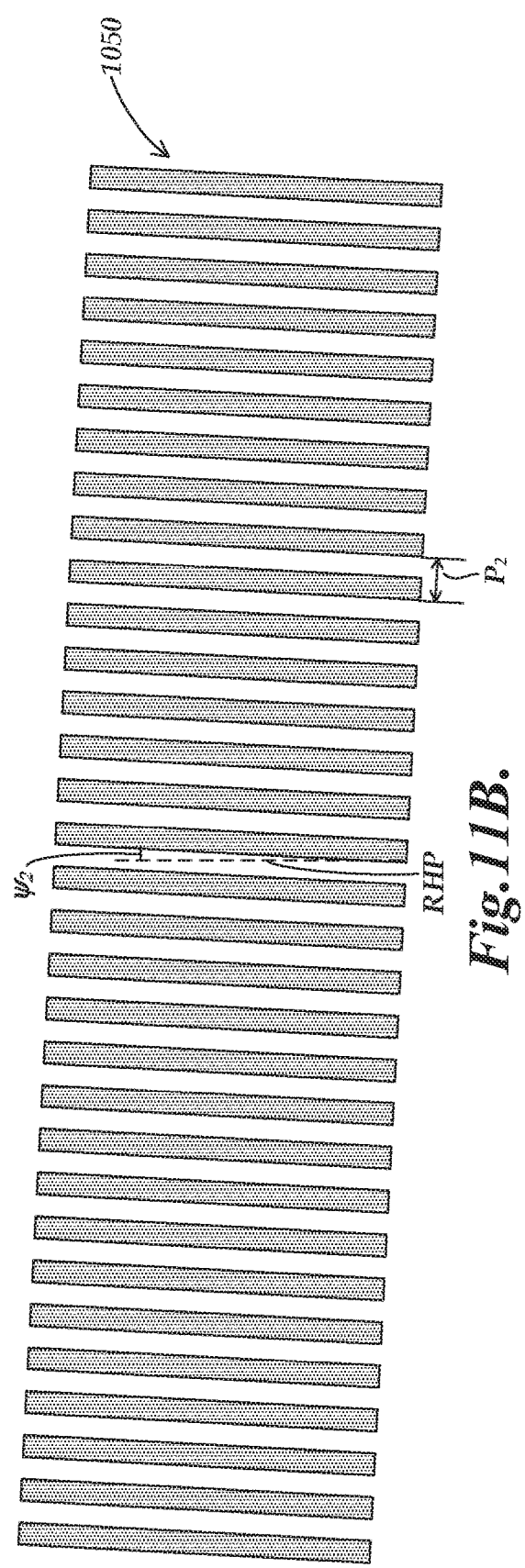
Fig.11A.
Fig.11B.

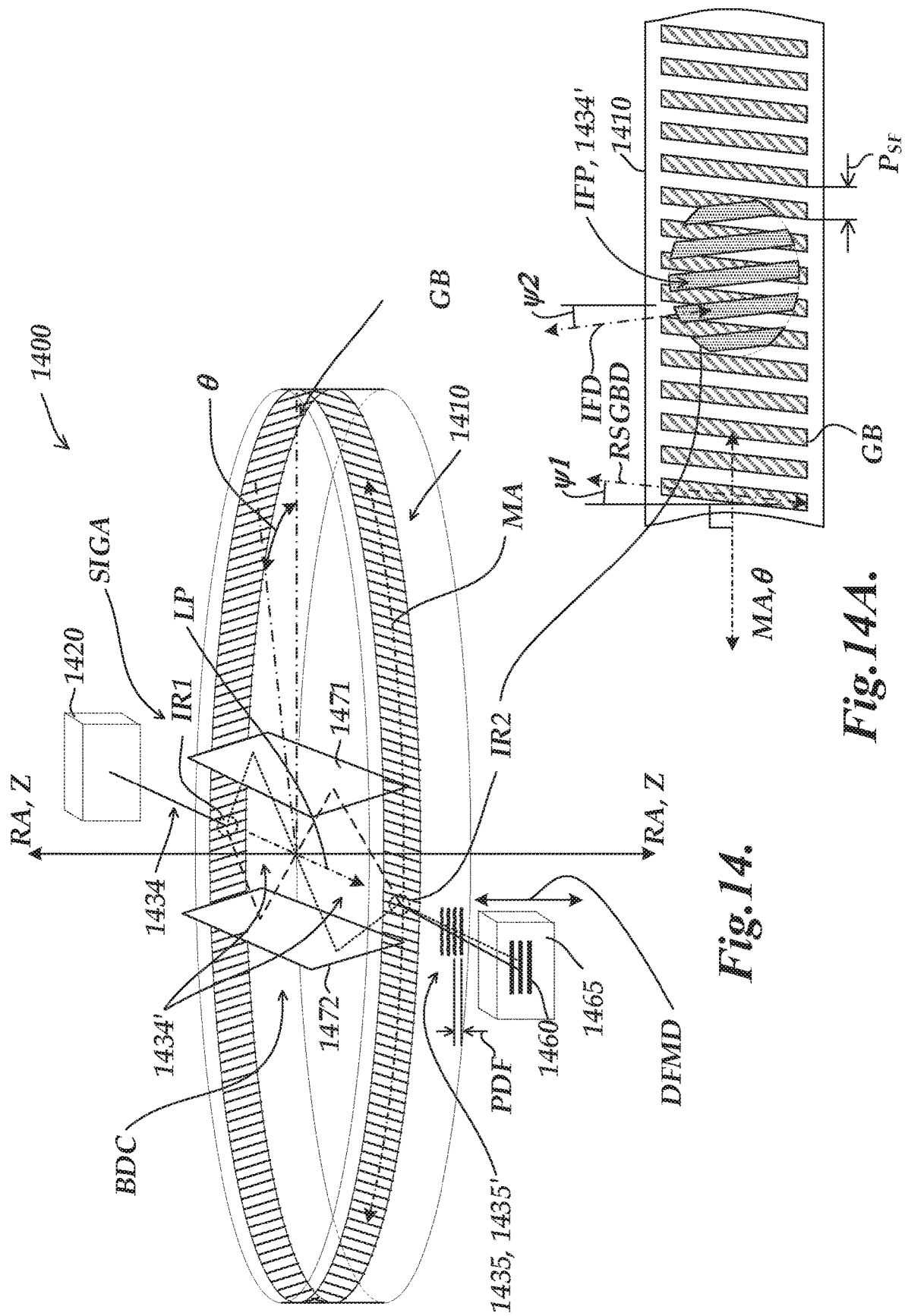

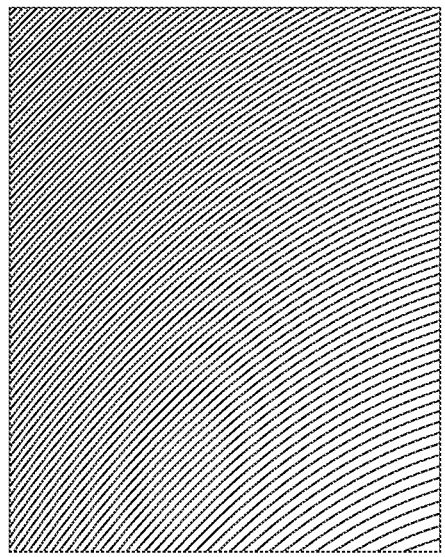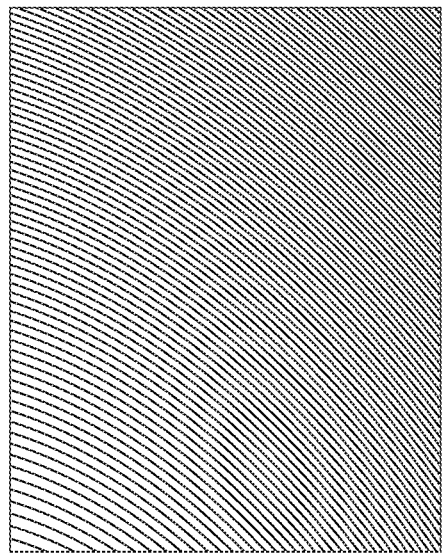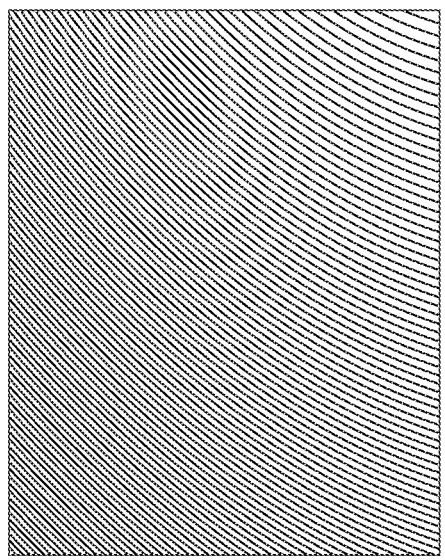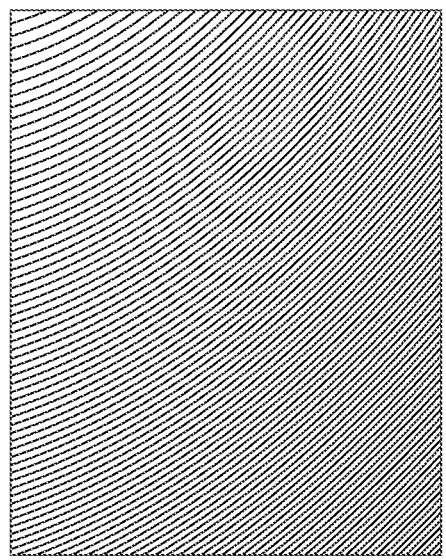
Fig. 18.

CONTAMINATION AND DEFECT RESISTANT ROTARY OPTICAL ENCODER CONFIGURATION INCLUDING A ROTARY SCALE WITH YAWED SCALE GRATING BARS AND STRUCTURED ILLUMINATION GENERATING ARRANGEMENT WITH A BEAM DEFLECTOR CONFIGURATION

CROSS-REFERENCE TO RELATED APPLICATION(S)

This application is a continuation-in-part of U.S. patent application Ser. No. 16/146,617, entitled "CONTAMINATION AND DEFECT RESISTANT OPTICAL ENCODER CONFIGURATION FOR PROVIDING DISPLACEMENT SIGNALS," filed Sep. 28, 2018; which is a continuation-in-part of U.S. patent application Ser. No. 15/942,135, entitled "CONTAMINATION AND DEFECT RESISTANT OPTICAL ENCODER CONFIGURATION FOR PROVIDING DISPLACEMENT SIGNALS," filed Mar. 30, 2018; which is a continuation-in-part of U.S. patent application Ser. No. 15/858,218, entitled "CONTAMINATION AND DEFECT RESISTANT OPTICAL ENCODER CONFIGURATION FOR PROVIDING DISPLACEMENT SIGNALS," filed Dec. 29, 2017; which is a continuation-in-part of U.S. patent application Ser. No. 15/702,520, entitled "CONTAMINATION AND DEFECT RESISTANT OPTICAL ENCODER CONFIGURATION FOR PROVIDING DISPLACEMENT SIGNALS," filed Sep. 12, 2017; which is a continuation-in-part of U.S. patent application Ser. No. 15/637,750, entitled "CONTAMINATION AND DEFECT RESISTANT OPTICAL ENCODER CONFIGURATION FOR PROVIDING DISPLACEMENT SIGNALS," filed Jun. 29, 2017, the disclosures of which are hereby incorporated herein by reference in their entirety.

BACKGROUND

Technical Field

The invention relates generally to precision position or displacement measurement instruments and, more particularly, to an encoder configuration with signal processing which is resistant to errors that may be associated with a contaminated or defective portion of a scale.

Description of the Related Art

Optical position encoders determine the displacement of a readhead relative to a scale that includes a pattern that is detected by the readhead. Typically, position encoders employ a scale that includes at least one scale track that has a periodic pattern, and the signals arising from that scale track are periodic as a function of displacement or position of the readhead along the scale track. Absolute type position encoders may use multiple scale tracks to provide a unique combination of signals at each position along an absolute scale.

Optical encoders may utilize incremental or absolute position scale structures. An incremental position scale structure allows the displacement of a readhead relative to a scale to be determined by accumulating incremental units of displacement, starting from an initial point along the scale. Such encoders are suitable for certain applications, particularly those where line power is available. In low power consumption applications (e.g., battery powered gauges and the like), it is more desirable to use absolute position scale structures. Absolute position scale structures provide a unique output signal, or combination of signals, at each position along a scale, and therefore allow various power conservation schemes. U.S. Pat. Nos. 3,882,482; 5,965,879; 5,279,044; 5,886,519; 5,237,391; 5,442,166; 4,964,727; 4,414,754; 4,109,389; 5,773,820; and 5,010,655 disclose various encoder configurations and/or signal processing techniques relevant to absolute position encoders, and are hereby incorporated herein by reference in their entirety.

Some encoder configurations realize certain advantages by utilizing an illumination source light diffraction grating in an illumination portion of the encoder configuration. U.S. Pat. Nos. 8,941,052; 9,018,578; 9,029,757; and 9,080,899, each of which is hereby incorporated herein by reference in its entirety, disclose such encoder configurations. Some of the configurations disclosed in these patents may also be characterized as utilizing super resolution moiré imaging.

In various applications, scale manufacturing defects or contaminants such as dust or oils on a scale track may disturb the pattern detected by the readhead, creating errors in the resulting position or displacement measurements. In general, the size of errors due to a defect or contamination may depend on factors such as the size of the defect or contamination, the wavelength of the periodic pattern on the scale, the size of the readhead detector area, the relationship between these sizes, and the like. A variety of methods are known for responding to abnormal signals in an encoder. Almost all such methods are based on disabling the encoder signals, or providing an "error signal" to warn the user, or adjusting a light source intensity to boost low signals, or the like. However, such methods do not provide a means of continuing accurate measurement operations despite the abnormal signals that arise from certain types of scale defects or contamination. Therefore, these methods have limited utility. One known method that does mitigate the effects of scale contaminants or defects on measurement accuracy is disclosed in Japanese Patent Application JP2003-065803 (the '803 Application). The '803 Application teaches a method wherein two or more photo detectors output periodic signals having the same phase, which are each input to respective signal stability judging means. The signal stability judging means only outputs signals that are judged to be "normal," and "normal" signals are combined as the basis for position measurement. Signals that are "abnormal" are excluded from position measurement calculations. However, the methods of judging "normal" and "abnormal" signals disclosed in the '803 Application have certain disadvantages that limit the utility of the teachings of the '803 Application.

U.S. Pat. No. 8,493,572 (the '572 patent) discloses a contamination and defect resistant optical encoder configuration which provides a means to select signals from photodetector elements which are not subject to contamination. However, the '572 patent relies on complex signal processing that may be less desirable in some applications.

Improved methods for providing accurate measurement operations that avoid or mitigate abnormal signals that arise from certain types of scale defects or contamination without the need for complex signal processing would be desirable.

BRIEF SUMMARY

A contamination and defect resistant rotary optical encoder configuration for providing displacement signals includes at least a first measurement channel comprising a rotary scale, an illumination source, a structured illumination generating arrangement and a detector arrangement. In some implementations, the rotary optical encoder configuration may be configured to use a rotary scale that is a cylindrical type scale. In some implementations, the rotary optical encoder configuration may be configured to use a rotary scale that is a planar (e.g., circular) type scale.

In either case, the rotary scale extends along a rotary measuring direction about a rotary axis that is perpendicular to a rotary plane. The rotary scale comprises a rotary scale grating comprising scale grating bars arranged on a rotary surface that extends along the rotary measuring direction. The scale grating bars are narrow along the rotary measuring direction and elongated along a rotary scale grating bar direction transverse to the rotary measuring direction, and are arranged periodically at a nominal scale pitch $P_{SF}$ along the rotary measuring direction. The illumination source comprises a light source that outputs source light to a structured illumination generating arrangement, the structured illumination generating arrangement comprising a first illumination region on the rotary scale, and a beam deflector configuration comprising at least first and second deflector elements, and a second illumination region on the rotary scale, wherein the structured illumination generating arrangement is configured to input the source light to the first illumination region which diffracts and outputs the source light as structured illumination light to the beam deflector configuration, which is configured to cause diffracted beams of the structured illumination light to cross over one another and transmit the resulting structured illumination light to overlap at the second illumination region on the rotary scale and form an illumination fringe pattern proximate to the second illumination region and incident on the detector, the illumination fringe pattern comprising fringes that are narrow along the rotary measuring direction and elongated along an illumination fringe direction oriented transverse to the rotary measuring direction.

It should be noted that the term "structured illumination light" as used herein, may refer to light beams or rays that interfere to form interference fringes or structured illumination somewhere along their optical path. At some locations along their optical path, such light beams or rays may be separate and non-interfering and/or may not be actively providing "structured illumination." However, even at such locations, such light beams or rays may still be referred to as "structure illumination light" because that is their important purpose or function during operation of the configurations disclosed herein.

It should be noted that the term "crossover" as used herein, with respect to diffracted beams or orders of diffracted light, is intended to refer to any optical path configuration for such beams which results in grating diffractions at the first and second illumination regions causing reinforcing or additive spatial phase changes in a detector fringe pattern that is output in the scale light from the second illumination region, as described further below. The term "crossover" is used for such optical path configurations, because various beam deflector configurations fulfill this requirement for first and second illumination regions on opposing sides of a rotary scale by deflecting two diverging beams of diffracted light such that they converge and "cross over" one another (e.g., proximate to the rotary axis and/or the middle of their optical paths) prior to imparting additional deflections which cause those two beams to then converge and overlap at the second illumination region.

The detector arrangement includes a photodetector configuration comprising a set of N spatial phase detectors arranged periodically at a detector pitch PD along a detected fringe motion direction that is transverse to the rotary measuring direction, wherein each spatial phase detector is configured to provide a respective spatial phase detector signal and at least a majority of the respective spatial phase detectors extend over a relatively longer dimension along the rotary measuring direction and are relatively narrow along the detected fringe motion direction transverse to the rotary measuring direction, and the set of N spatial phase detectors are arranged in a spatial phase sequence along the detected fringe motion direction. In various implementations of the contamination and defect resistant rotary optical encoder, the aforementioned elements may be configured as follows:

The rotary scale may be configured with the rotary scale grating bar direction oriented at a nonzero yaw angle $\psi$ relative to a direction perpendicular to the measuring axis direction and along the rotary surface. The structured illumination generating arrangement may be configured such that the illumination fringe direction of the illumination fringe pattern proximate to the second illumination region on the rotary scale is oriented at a nominal fringe direction yaw angle that is rotated by a non-zero yaw difference angle YDA relative to the scale grating bar direction proximate to the second illumination region on the rotary scale. The rotary scale grating may be configured to input the illumination fringe pattern at the second illumination region and output scale light that forms a periodic scale light pattern comprising a detector fringe pattern at the photodetector configuration, the detector fringe pattern comprising periodic high and low intensity bands that extend over a relatively longer dimension along a direction parallel to the rotary measuring direction and that are relatively narrow and periodic with a detected fringe period PDF along the detected fringe motion direction transverse to the rotary measuring direction. The detected fringe period PDF and the detected fringe motion direction may be transverse to the rotary measuring direction and depend at least partially on the nonzero yaw angle $\psi$. The high and low intensity bands move along the detected fringe motion direction transverse to the rotary measuring direction as the scale grating rotates about the rotary axis. The photodetector configuration is configured to detect a displacement of the high and low intensity bands along the detected fringe motion direction transverse to the rotary measuring direction and provide respective spatial phase displacement signals that are indicative of the rotary scale displacement.

In various implementations outlined above, the non-zero yaw difference angle YDA is nominally $-2\psi$. In various implementations, each of the N spatial phase detectors comprises an even number of scale light receptor areas. In various implementations, the detected fringe period PDF may be at least 40 micrometers. In various implementations, the beam deflector configuration may comprise a transparent optical block, and the deflector elements of the beam deflector configuration may comprise surfaces of the transparent optical block, or elements formed on or attached to surfaces of the transparent optical block.

As previously noted, in some implementations the rotary optical encoder configuration is a "cylindrical rotary encoder" configured to use a cylindrical type scale rotary scale. The cylindrical type scale rotary scale comprises a nominally cylindrical rotary surface with the scale grating bars arranged thereon. In such implementations, the first and second illumination regions may be located proximate to opposite ends of a diameter of the cylindrical rotary scale and the illumination source is configured to output the source light to the first illumination region along a line that intersects the first and second illumination regions.

In some such cylindrical rotary encoder implementations, and the beam deflector configuration is arranged in a volume bounded by a projection of the cylindrical rotary surface along the direction of the rotary axis.

In some such cylindrical rotary encoder implementations, the beam deflector configuration is configured to receive respective diverging beams of the diffracted source light that is output from the first illumination region and deflect those respective beams along converging beam paths that cross over proximate to the rotary axis such that they continue on along diverging beam paths, and to receive those respective beams and deflect them such that they continue on along converging beam paths to overlap and form the illumination fringe pattern proximate to the second illumination region. In some such implementations, the beam deflector configuration comprises first and second parallel planar mirrors or gratings that are located on opposite sides of the rotary axis and that have respective surface planes that extend parallel to a diameter of the cylindrical rotary scale that intersects the first and second illumination regions, and that are each oriented to receive respective beams of the diffracted source light that is output from the first illumination region, and the first and second parallel planar mirrors or gratings are furthermore configured to receive the respective beams of the diffracted source light that is output from the first illumination region and deflect those respective beams along converging beam paths that cross over proximate to the rotary axis such that they continue on along diverging beam paths, and to receive those respective beams and deflect them such that they continue on along converging beam paths to overlap and form the illumination fringe pattern proximate to the second illumination region. In other such implementations, at least one of the illumination source and the beam deflector configuration are configured such that the respective beams of the diffracted source light are focused proximate to their crossover proximate to the rotary axis, and at least one of the beam deflector configuration and the detector arrangement are configured such that the output reflected scale light that forms the periodic scale light pattern comprising the detector fringe pattern is nominally collimated at the photodetector configuration.

In some such cylindrical rotary encoder implementations, the contamination and defect resistant optical encoder configuration further includes at least a second measurement channel conforming to the claimed configuration of the first measurement channel, wherein a combination of the respective spatial phase displacement signals of the first and second measurement channels, or measurements derived therefrom, mitigates or compensates for potential misalignment errors that may otherwise arise in their individual spatial phase displacement signals or measurements derived therefrom. In some such implementations, the first measurement channel includes the scale grating bars arranged with the yaw angle $\psi$ along a first scale track on the rotary scale, the second measurement channel includes the scale grating bars arranged with a yaw angle $-\psi$ along a second scale track on the rotary scale that is spaced apart along the direction of the rotary axis from first scale track; and a single beam deflector configuration is shared by the first and second measurement channels.

As previously noted, in some implementations the rotary optical encoder configuration is a "planar rotary encoder" configured to use a planar (e.g., circular) type rotary scale.

Various such planar rotary encoders may use a transmissive or reflective planar rotary encoder implementation, wherein the planar circular type rotary scale comprises a planar rotary surface with scale grating bars arranged at a constant angular pitch $AP_{SF}$ thereon. In reflective planar rotary encoder implementations, the illumination source, the beam deflector configuration, and the detector arrangement of the first measuring channel are all arranged on the same side of the rotary scale. The first and second illumination regions are located proximate to opposite ends of a diameter of the rotary scale, and the illumination source is configured to output the source light to the first illumination region along a plane that intersects the first and second illumination regions, and at an angle of incidence relative to the planar rotary surface in that plane. The beam deflector configuration is configured to receive respective beams of the diffracted source light that is reflected and output from the first illumination region and deflect those respective beams along converging beam paths that cross over proximate to the rotary axis, and to reflect those respective beams proximate to their crossover proximate to the rotary axis such that they continue on along diverging beam paths, and to receive those respective beams and deflect them such that they continue on along converging beam paths to overlap and form the illumination fringe pattern proximate to the second illumination region, and the second illumination region is configured to input the illumination fringe pattern and output reflected scale light at an angle of incidence relative to the planar rotary surface to form the periodic scale light pattern comprising the detector fringe pattern at the photodetector configuration.

In some such reflective planar rotary encoder implementations at least one of the illumination source and the beam deflector configuration are configured such that the respective beams of the diffracted source light are focused proximate to their crossover proximate to the rotary axis, and at least one of the beam deflector configuration and the detector arrangement are configured such that the output reflected scale light that forms the periodic scale light pattern comprising the detector fringe pattern is nominally collimated at the photodetector configuration.

In some such reflective planar rotary encoder implementations, the first and second illumination regions are located proximate to opposite ends of a diameter through the rotary axis of the rotary scale, and the illumination source is configured to output the source light to the first illumination region along a nominal illumination plane that is nominally normal to the planar rotary surface and nominally parallel to that diameter and that is offset from that diameter by a nominal illumination plane offset. The first and second illumination regions are each offset from that diameter by the nominal illumination plane offset, and the nominal illumination plane offset is configured to align the nominal illumination plane parallel to the nominal or average alignment of the scale grating bars in the second illumination region that have the nonzero yaw angle $\psi$ relative to the direction perpendicular to the measuring axis direction and along the rotary surface, which results in the nominal fringe direction yaw angle being rotated at the non-zero yaw difference angle YDA relative to the nominal illumination plane in the second illumination region. In some such implementations, the non-zero yaw difference angle YDA is advantageously configured to be two times the nonzero yaw angle $\psi$.

In some such reflective planar rotary encoder implementations, the beam deflector configuration comprises first and second pairs of transmissive gratings and an crossover region reflector. The first pair of transmissive gratings is arranged on a planar surface that is nominally parallel to the rotary plane, and the respective gratings of that pair are located to receive respective beams of the diffracted source light that is reflected and output from the first illumination region, and the respective gratings of that pair each comprise grating bars that are configured to deflect their respective beams along converging beam paths that cross over proximate to the rotary axis. The crossover region reflector is located proximate to where the converging beam paths cross over near the rotary axis, and is configured to reflect those respective beams to continue on along diverging beam paths from the crossover region reflector. The second pair of transmissive gratings is arranged on a planar surface that is nominally parallel to the rotary plane, and the respective gratings of that pair are located to receive respective beams along the diverging beam paths, and the respective gratings of that pair each comprise grating bars that are configured to deflect those respective beams along converging beam paths to overlap and form the illumination fringe pattern proximate to the second illumination region. In some such implementations, in the first pair of transmissive gratings the respective gratings of that pair are each configured to receive collimated light in their respective beams, and comprise curved grating bars that are configured to deflect their respective beams along converging beam paths that cross over proximate to the rotary axis, and to focus those respective beams proximate to the rotary axis. In the second pair of transmissive gratings, the respective gratings of that pair are each configured to receive diverging light in their respective beams, and comprise curved grating bars that are configured to collimate and deflect the light in their respective beams to provide collimated light beams along converging beam paths to overlap and form the illumination fringe pattern proximate to the second illumination region. In some such implementations, the crossover region reflector comprises a curved surface.

BRIEF DESCRIPTION OF THE DRAWINGS

The foregoing aspects and many of the attendant advantages will become more readily appreciated as the same become better understood by reference to the following detailed description, when taken in conjunction with the accompanying drawings.

FIG. 11A is a schematic diagram of a first illumination source diffraction grating.

FIG. 11B is a schematic diagram of a second illumination source diffraction grating.

FIG. 14 is a partially schematic isometric view of a first implementation of a contamination and defect resistant rotary optical encoder configuration which uses a cylindrical type rotary scale for providing displacement signals.

FIG. 14A is a diagram of a portion of the rotary scale grating of FIG. 14 showing additional details in an illumination region on its rotary scale.

FIG. 18 is a diagram schematically representing grating patterns usable in one implementation of a beam deflection configuration usable in the rotary optical encoder configuration shown in FIG. 17.

DETAILED DESCRIPTION

Figure 1:
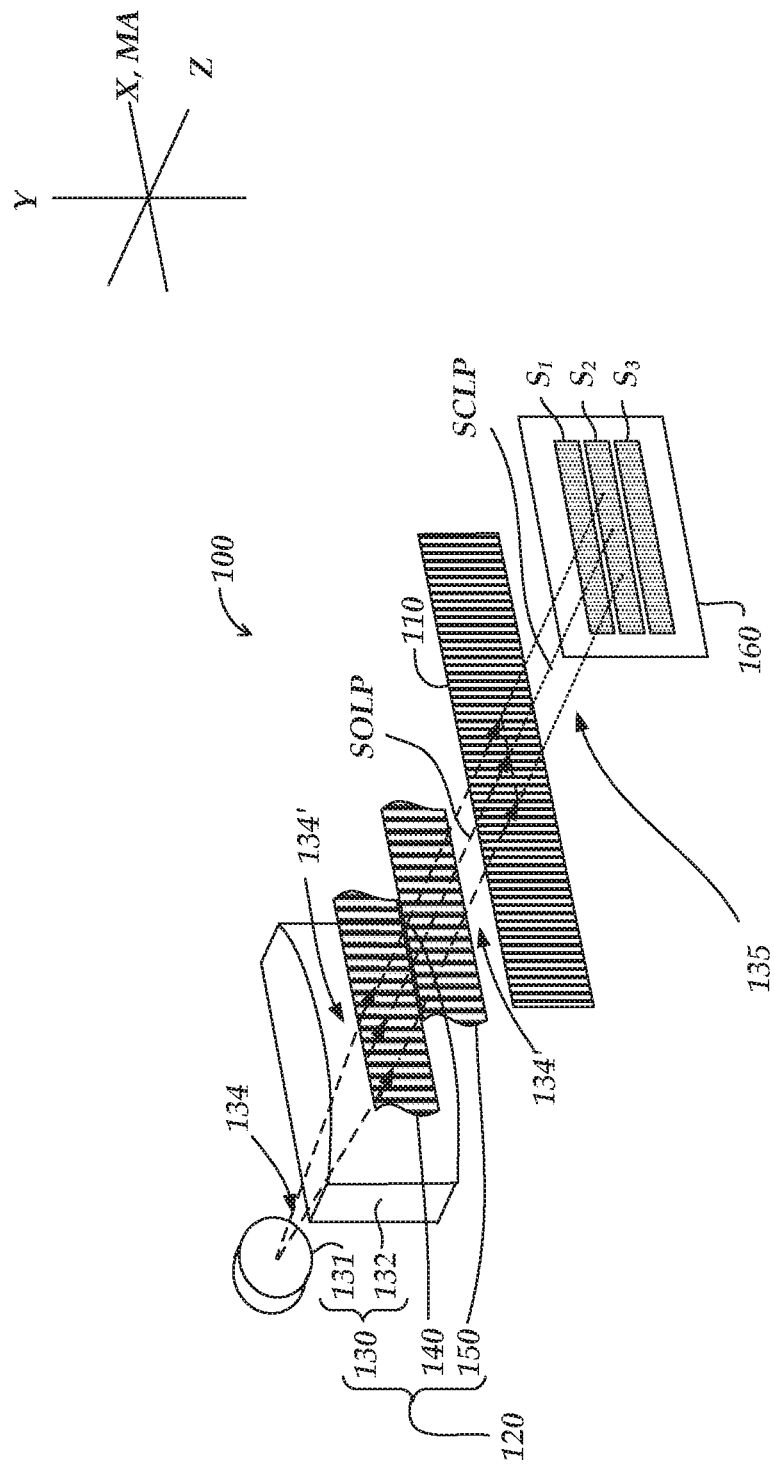
FIG. 1 is a partially schematic exploded diagram of a contamination and defect resistant optical encoder configuration for providing displacement signals.

FIG. 1 is a partially schematic exploded diagram of a contamination and defect resistant optical encoder configuration 100 for providing displacement signals. The encoder configuration 100 comprises a scale grating 110, an illumination portion 120, and a photodetector configuration 160.

FIG. 1 shows orthogonal X, Y, and Z directions, according to a convention used herein. The X and Y directions are parallel to the plane of the scale grating 110, with the X direction parallel to a measuring axis direction MA (e.g., perpendicular to elongated pattern elements of the scale grating 110). The Z direction is normal to the plane of the scale grating 110.

In the implementation shown in FIG. 1, the scale grating 110 is a transmissive grating. The scale grating 110 extends along a measuring axis direction MA, and comprises a periodic pattern comprising bars that are narrow along the measuring axis direction MA and elongated along a perpendicular to the measuring axis direction MA (i.e., the Y direction), and that are arranged periodically along the measuring axis direction MA.

The illumination portion 120 comprises an illumination source 130, a first illumination grating 140, and a second illumination grating 150. The illumination source 130 comprises a light source 131, and a collimating lens 132. The light source 131 is configured to output source light 134 to the collimating lens 132. The collimating lens 132 is configured to receive the source light 134 and output collimated source light 134' to the first illumination grating 140. The first illumination grating 140 receives the source light 134' and diffracts the source light 134' toward the second illumination grating 150. The second illumination grating 150 receives the source light 134' and further diffracts the source light 134' toward the scale grating 110 along a source light path SOLP. The scale grating 110 inputs the source light 134' along the source light path SOLP and outputs scale light comprising a periodic scale light pattern 135 along a scale light path SCLP to the photodetector configuration 160. The photodetector configuration 160 receives the periodic scale light pattern 135 from the scale grating 110 along the scale light path SCLP. The periodic scale light pattern 135 displaces past the photodetector configuration 160 corresponding to a relative displacement between the scale grating 110 and the photodetector configuration 160 along the measuring axis direction MA. An example of a photodetector configuration similar to the photodetector configuration 160 is shown in detail FIG. 3. The photodetector configuration 160 comprises a set of N spatial phase detectors arranged in a spatial phase sequence along a direction transverse to the measuring axis direction MA (i.e., the Y direction), where N is an integer that is at least 6 and the spatial phase sequence comprises two outer spatial phase detectors at a start and end of the sequence along the direction transverse to the measuring axis and an interior group of spatial phase detectors located between the two outer spatial phase detectors. In the implementation shown in FIG. 1, the set of N spatial phase photodetectors comprises 3 subsets of spatial phase detectors $S_1$, $S_2$, and $S_3$ that have the same subset spatial phase sequence.

At least a majority of the respective spatial phase detectors are relatively elongated along the measuring axis direction MA and relatively narrow along the direction perpendicular to the measuring axis direction MA (i.e., the Y direction), and comprise scale light receptor areas that are spatially periodic along the measuring axis direction MA and positioned corresponding to a respective spatial phase of that spatial phase detector relative to the periodic scale light pattern, and are configured to provide a respective spatial phase detector signal. Each spatial phase detector in the interior group is preceded and followed in the spatial phase sequence by spatial phase detectors that have respective spatial phases that are different from that spatial phase detector and different from each other.

In various applications, the photodetector configuration 160 and the illumination portion 120 may be mounted in a fixed relationship relative to one another, e.g., in a readhead or gauge housing (not shown), and are guided along the measuring axis direction MA relative to the scale grating 110 by a bearing system, according to known techniques. The scale grating 110 may be attached to a moving stage, or a gauge spindle, or the like, in various applications.

It should be appreciated that the contamination and defect resistant optical encoder configuration 100 is only one example of a contamination and defect resistant optical encoder configuration according to the principles disclosed herein. In alternative implementations, various optical components may be utilized such as a telecentric imaging system, limiting apertures, and the like. In alternative implementations, an illumination portion may comprise only a single illumination grating.

Figure 2:
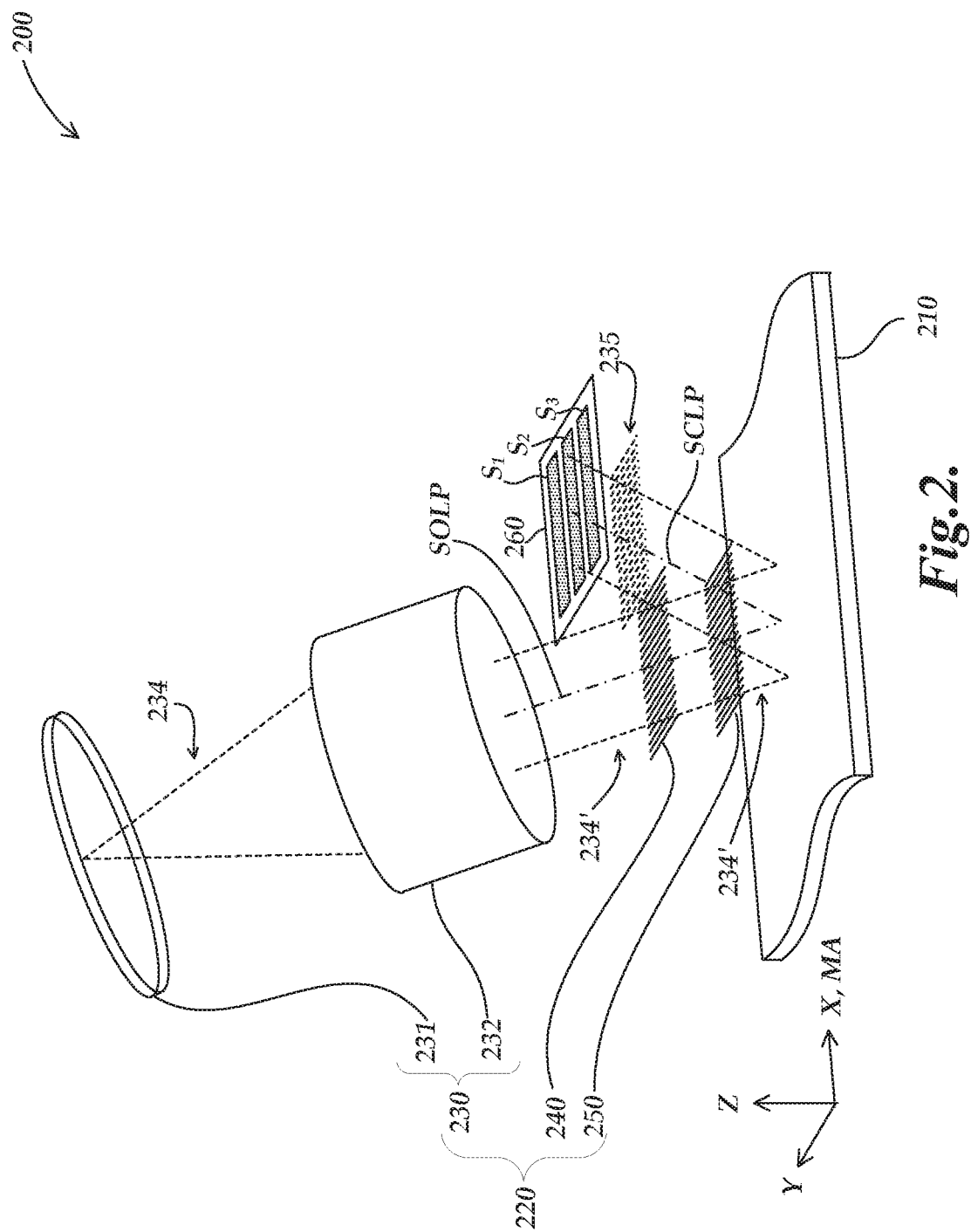
FIG. 2 is a partially schematic diagram of a contamination and defect resistant optical encoder configuration for providing displacement signals.

FIG. 2 is a partially schematic diagram of a contamination and defect resistant optical encoder configuration 200 for providing displacement signals. The optical encoder configuration 200 is similar to the encoder configuration 100. Similar references numbers 2XX in FIGS. 2 and 1XX in FIG. 1 may refer to similar elements unless otherwise indicated by context or description. The encoder configuration 200 shown in FIG. 2 is a reflective configuration. Scale 210 is a reflective scale grating.

Figure 3:
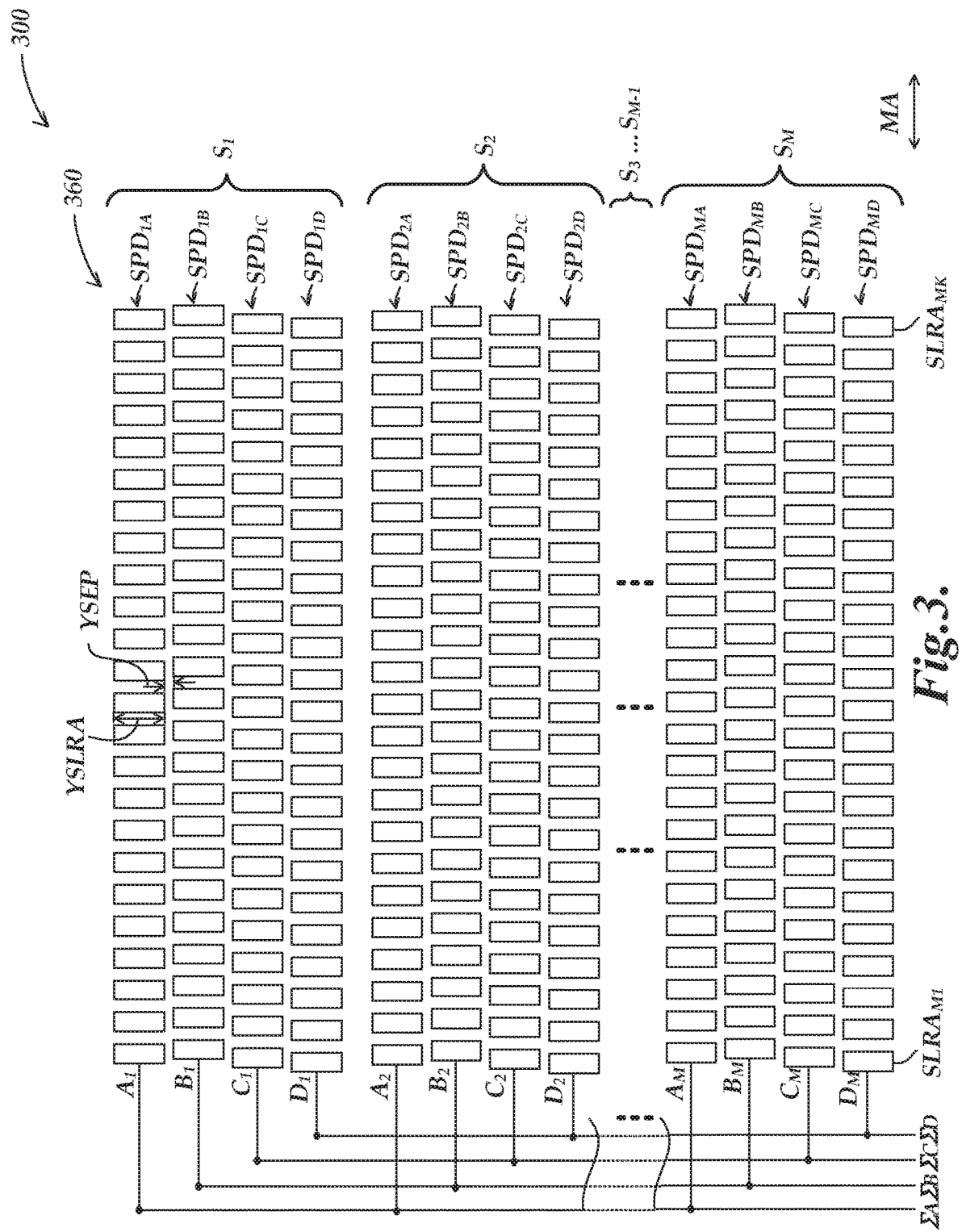
FIG. 3 is a partially schematic diagram of a photodetector configuration of a contamination and defect resistant optical encoder configuration.

FIG. 3 is a partially schematic diagram of a photodetector configuration 360 of a contamination and defect resistant optical encoder configuration 300. The contamination and defect resistant optical encoder configuration 300 may be similar to the contamination and defect resistant optical encoder configuration 100 or the contamination and defect resistant optical encoder configuration 200. The photodetector configuration 360 comprises a set of N spatial phase detectors arranged in a spatial phase sequence along a direction transverse to the measuring axis direction MA, where N is an integer that is at least 6 and the spatial phase sequence comprises two outer spatial phase detectors at a start and end of the sequence along the direction transverse to the measuring axis and an interior group of spatial phase detectors located between the two outer spatial phase detectors. At least a majority of the respective spatial phase detectors are relatively elongated along the measuring axis direction MA and relatively narrow along the direction perpendicular to the measuring axis direction MA, and comprise scale light receptor areas that are spatially periodic along the measuring axis direction MA and positioned corresponding to a respective spatial phase of that spatial phase detector relative to the periodic scale light pattern, and are configured to provide a respective spatial phase detector signal. Each spatial phase detector in the interior group is preceded and followed in the spatial phase sequence by spatial phase detectors that have respective spatial phases that are different from that spatial phase detector and different from each other.

In some implementations, the set of N spatial phase photodetectors may comprise at least M subsets of spatial phase detectors, where M is an integer that is at least 2, and wherein each of the M subsets includes spatial phase detectors that provide each of the respective spatial phases included in the set of N spatial phase photodetectors. In some implementations, M may be at least 3. In some implementations, M may be at least 6. In some implementations, each of the M subsets of spatial phase detectors may comprise spatial phase detectors that provide the same respective spatial phases arranged in the same subset spatial phase sequence. FIG. 3 shows an implementation with M subsets of spatial phase detectors indicated as $S_1$ through $S_M$. The subset $S_1$ comprises spatial phase detectors $SPD_{1A}$, $SPD_{1B}$, $SPD_{1C}$, and $SPD_{1D}$. The subset $S_2$ comprises spatial phase detectors $SPD_{2A}$, $SPD_{2B}$, $SPD_{2C}$, and $SPD_{2D}$. The subset $S_M$ comprises spatial phase detectors $SPD_{MA}$, $SPD_{MB}$, $SPD_{MC}$, and $SPD_{MD}$. Each of the spatial phase detectors in FIG. 3 is shown to have K scale light receptor areas. As an example of scale light receptor areas, the spatial phase detector $SPD_{MD}$ is labeled with scale light receptor areas $SLRA_{M1}$ and $SLRA_{ML}$. In some implementations, K may be an even value.

In the implementation shown in FIG. 3, the spatial phase sequence is indicated by spatial phase detectors including subscript indices A, B, C, and D (e.g., the spatial phase detectors $SPD_{1A}$, $SPD_{1B}$, $SPD_{1C}$, and $SPD_{1D}$). The spatial phase detectors with subscript indices A and D are the two outer spatial phase detectors at the start and end of each instance of the spatial phase sequence. The spatial phase detectors with subscript indices B and C are the interior groups.

The spatial phase detectors $SPD_{1A}$, $SPD_{1B}$, $SPD_{1C}$, and $SPD_{1D}$ output respective spatial phase detector signals $A_1$, $B_1$, $C_1$, and $D_1$. The spatial phase detectors $SPD_{2A}$, $SPD_{2B}$, $SPD_{2C}$, and $SPD_{2D}$ output respective spatial phase detector signals $A_2$, $B_2$, $C_2$, and $D_2$. The spatial phase detectors $SPD_{MA}$, $SPD_{MB}$, $SPD_{MC}$, and $SPD_{MD}$, output respective spatial phase detector signals $A_M$, $B_M$, $C_M$, and $D_M$.

A contamination and defect resistant optical encoder configured according to the principles disclosed herein provides a simple design which may be tolerant to contaminants (e.g., wirebonding contamination) which are as large as 100 micrometers and scale defects which are as large as 300 micrometers. Contaminants or defects on a scale will typically produce a common mode error component on adjacent spatial phase detectors which may be canceled out in signal processing (e.g., quadrature processing). Spatial phase detectors which are relatively elongated along the measuring axis direction MA and relatively narrow along the direction perpendicular to the measuring axis direction MA provide better resistance to contamination and defects. Signal levels may change more slowly by decreasing the frequency of the structure of the spatial phase detectors along the measuring axis direction MA. Furthermore, such an encoder does not require complex signal processing to provide tolerance to contamination and defects. Signals provided by the set of N spatial phase detectors may be processed according to standard techniques known to one skilled in the art.

In some implementations such as the implementation shown in FIG. 3, N is at least 8 and each subset of spatial phase detectors may comprise four spatial phase detectors having respective spatial phases separated by 90 degrees. In alternative implementations, each subset of spatial phase detectors may comprise three spatial phase detectors having respective spatial phases separated by 120 degrees.

In the implementation shown in FIG. 3, the photodetector configuration 360 includes connections configured to combine spatial phase detector signals corresponding to the same respective spatial phase and to output each such combination as a respective spatial phase position signal. The photodetector configuration 360 is configured to output four spatial phase position signals corresponding to spatial phases separated by 90 degrees. Spatial phase signals with the same letter designation (e.g., $A_1$, $A_2$, and $A_M$) are combined (e.g., summed) to provide spatial phase signals $\Sigma A$, $\Sigma B$, $\Sigma C$, and $\Sigma D$. In alternative implementations, a photodetector configuration may be configured to output three spatial phase position signals corresponding to spatial phases separated by 120 degrees. In either case, spatial phase position signals may be further utilized to determine displacement signals, e.g., through quadrature or three-phase signal processing.

In some implementations, each of the respective spatial phase detectors may be relatively elongated along the measuring axis direction MA and relatively narrow along the direction perpendicular to the measuring axis direction MA, and may comprise scale light receptor areas that are spatially periodic along the measuring axis direction MA and positioned corresponding to a respective spatial phase of that spatial phase detector relative to the periodic scale light pattern, and may be configured to provide a respective spatial phase detector signal.

In some implementations, a dimension YSLRA of the scale light receptor areas of each of the N spatial phase detectors along the Y direction may be at most 250 micrometers. In some implementations, YSLRA may be at least 5 micrometers.

In some implementations, a separation distance YSEP between the scale light receptor areas of each adjacent pair of the N spatial phase detectors along the Y direction may be at most 25 micrometers.

In some implementations, a dimension YSLRA of the scale light receptor areas of each of the N spatial phase detectors may be the same along the Y direction. In some implementations, a separation distance YSEP between the scale light receptor areas of each adjacent pair of the N spatial phase detectors may be the same along the Y direction.

It should be appreciated that while a large value of N provides greater robustness to contamination, there is a tradeoff in that a large value of N may provide smaller signal levels within each individual spatial phase detector.

Figure 4A:
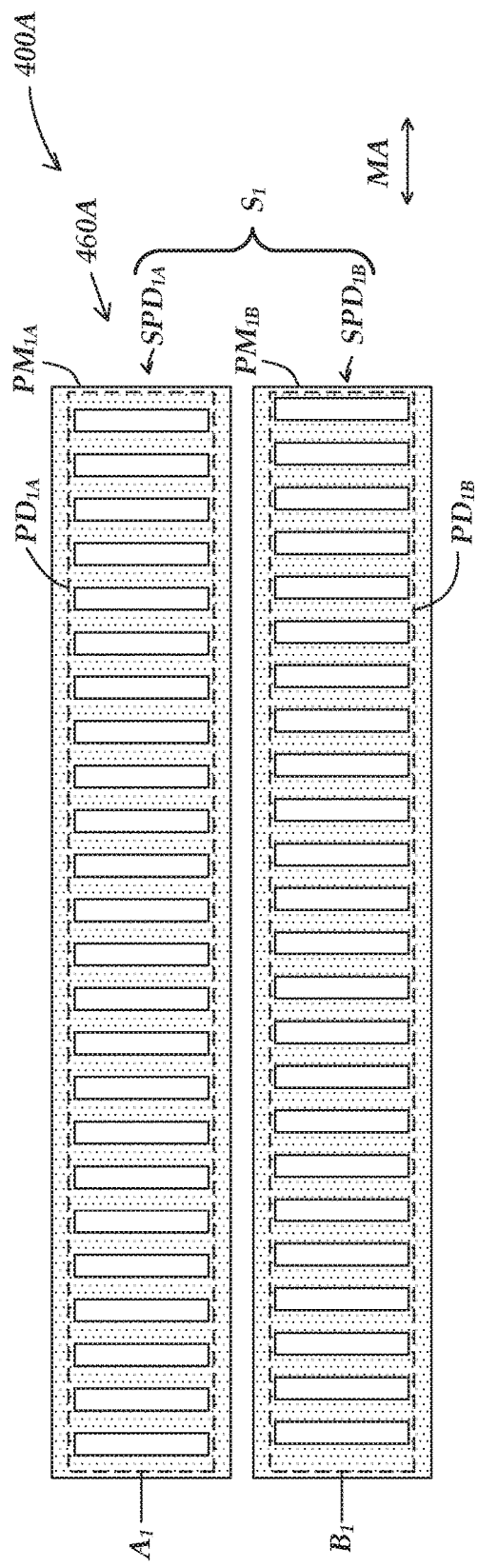
FIG. 4A is a schematic diagram of a portion of a photodetector configuration of a contamination and defect resistant optical encoder configuration.

FIG. 4A is a schematic diagram of a portion of a photodetector configuration 460A of a contamination and defect resistant optical encoder configuration 400A. For simplicity, FIG. 4A only shows one subset of spatial phase detectors $S_1$ with two spatial phase detectors $SPD_{1A}$ and $SPD_{1B}$. It should be appreciated that the photodetector configuration 460A comprises at least six spatial phase detectors according to the principles disclosed herein, but only two are shown for simplicity. In the implementation shown in FIG. 4A, each of the N spatial phase detectors (e.g., spatial phase detectors $SPD_{1A}$ and $SPD_{1B}$) comprises a photodetector (e.g., photodetectors $PD_{1A}$ and $PD_{1B}$ indicated by dashed lines) covered by a spatial phase mask (e.g., phase masks $PM_{1A}$ and $PM_{1B}$) that blocks the photodetector from receiving the periodic scale light pattern except through openings included in the spatial phase mask. In this case, the scale light receptor areas comprise areas of the photodetectors (e.g., the photodetectors $PD_{1A}$ and $PD_{1B}$) that are exposed through the openings in the respective spatial phase masks (e.g., the spatial phase masks $PM_{1A}$ and $PM_{1B}$). In the implementation shown in FIG. 4A, the scale light receptor areas (i.e., the openings) of the phase mask $PM_{1B}$ are offset relative to the scale light receptor areas of the phase mask $PM_{1A}$ along the measuring axis direction MA by 90 degrees. It should be appreciated that the while the spatial phase masks $PM_{1A}$ and $PM_{1B}$ are schematically illustrated as separate portions in FIG. 4A, in some implementations, they may be conveniently constructed with the same material in the same process to eliminate any potential positioning errors.

Figure 4B:
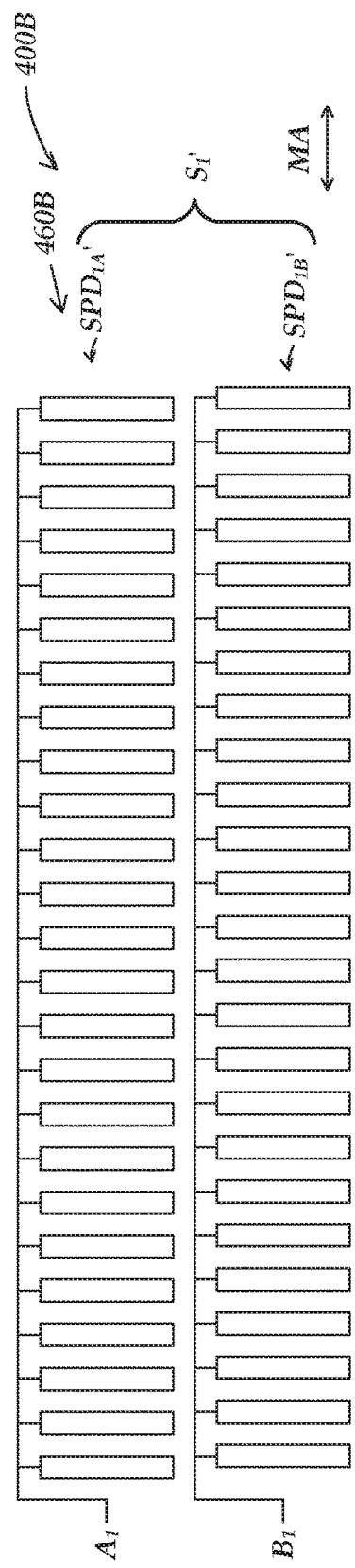
FIG. 4B is a schematic diagram of a portion of a photodetector configuration of a contamination and defect resistant optical encoder configuration.

FIG. 4B is a schematic diagram of a portion of a photodetector configuration 460B of a contamination and defect resistant optical encoder configuration 400B. For simplicity, FIG. 4B only shows one subset of spatial phase detectors $S_1'$ with two spatial phase detectors $SPD_{1A}'$ and $SPD_{1B}'$. It should be appreciated that the photodetector configuration 460B comprises at least six spatial phase detectors according to the principles disclosed herein, but only two are shown for simplicity. In the implementation shown in FIG. 4B, each of the N spatial phase detectors (e.g., spatial phase detectors $SPD_{1A}'$ and $SPD_{1B}'$) comprises a periodic array of electrically interconnected photodetector areas that receive the periodic scale light pattern. In this case, the scale light receptor areas comprise the photodetector areas of the periodic array of photodetectors. In the implementation shown in FIG. 4B, the photodetector areas of the spatial phase detector $SPD_{1B}'$ are offset relative to the photodetector areas of the spatial phase detector $SPD_{1A}'$ along the measuring axis direction MA by 90 degrees.

Figure 5:
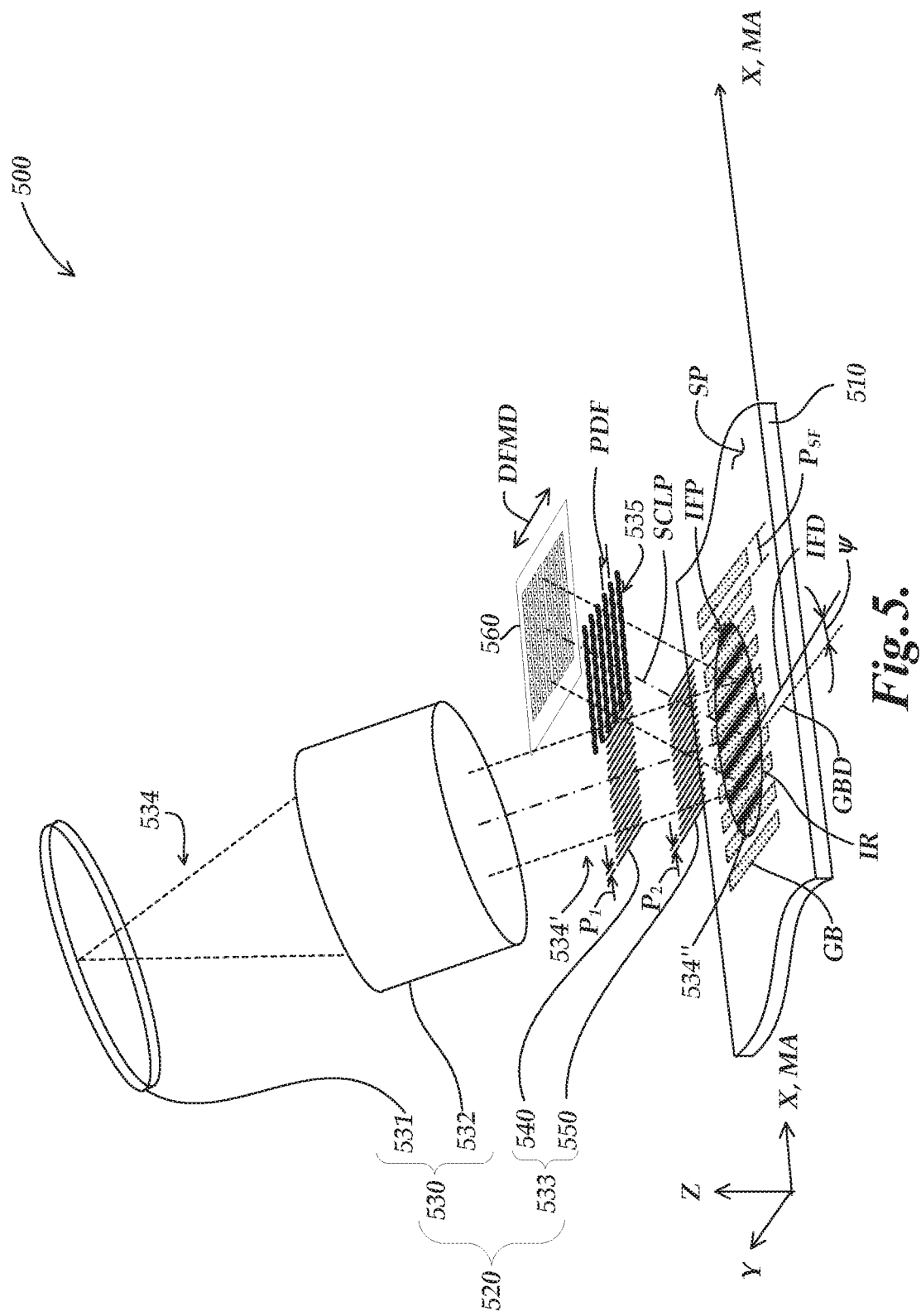
FIG. 5 is a partially schematic diagram of an additional implementation of a contamination and defect resistant optical encoder configuration for providing displacement signals, wherein a detector fringe pattern moves transverse to the measuring axis direction during optical encoder displacement.

FIG. 5 is a partially schematic diagram of an additional implementation of a contamination and defect resistant optical encoder configuration 500 for providing displacement signals. In the encoder configuration 500, the periodic scale light pattern 535 that is detected comprises a detector fringe pattern 535, which includes bands that are oriented to extend over a relatively longer dimension along the measuring axis direction MA, and that move transverse to the measuring axis direction along a detected fringe motion direction DFMD during optical encoder displacement.

The encoder configuration 500 comprises a scale 510, an illumination source 520, and a photodetector configuration 560. The scale 510 extends along a measuring axis direction MA, and comprises a scale grating comprising grating bars GB arranged in a scale plane SP that is nominally parallel to the measuring axis direction MA, wherein the grating bars GB are narrow along the measuring axis direction MA and elongated along a grating bar direction GBD transverse to the measuring axis direction MA, and are arranged periodically at a scale pitch $P_{SF}$ along the measuring axis direction MA. The illumination source 520 comprises a light source 530 that outputs light 534', and a structured illumination generating portion 533 configured to input the light 534' and output structured illumination 534" to an illumination region IR at the scale plane SP, where the structured illumination 534" comprises an illumination fringe pattern IFP comprising fringes that are narrow along the measuring axis direction MA and elongated along an illumination fringe direction IFD oriented transverse to the measuring axis direction MA at a nonzero illumination fringe yaw angle $\psi$ relative to the grating bar direction GBD. The light source 530 comprises a point source 531 and a collimating lens 532. The point source 531 outputs light 534 to the collimating lens which then collimates the light 534 to provide the light 534'. The nonzero illumination fringe yaw angle $\psi$ may be achieved in various implementations by rotating one or more elements of the structured illumination generating portion 533 (e.g., one of the grating elements 540 and/or 550) about the Z axis, to a desired angle relative to the Y axis. In some embodiments, the nonzero illumination fringe yaw angle $\psi$ may also be achieved or augmented by rotating the grating bar direction GBD about the Z axis, to a desired angle relative to the Y axis.

Figure 8:
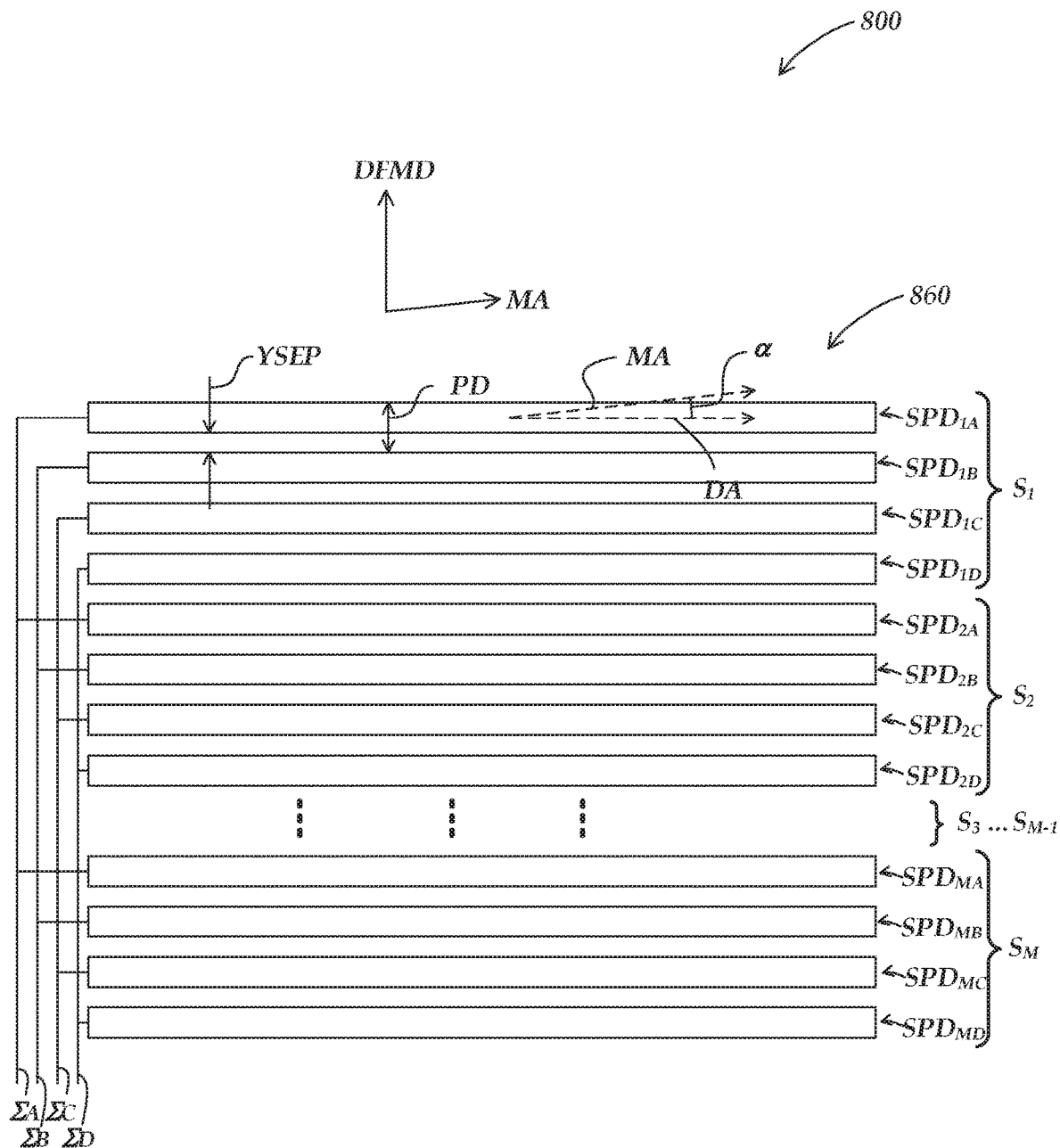
FIG. 8 is a schematic diagram of one exemplary photodetector configuration usable in a contamination and defect resistant optical encoder similar to the optical encoder represented in FIG. 5 and FIG. 6, wherein the photodetector configuration includes spatial phase detectors that are elongated approximately along the measuring axis direction and arranged periodically transverse to the measuring axis direction.
Figure 9A:
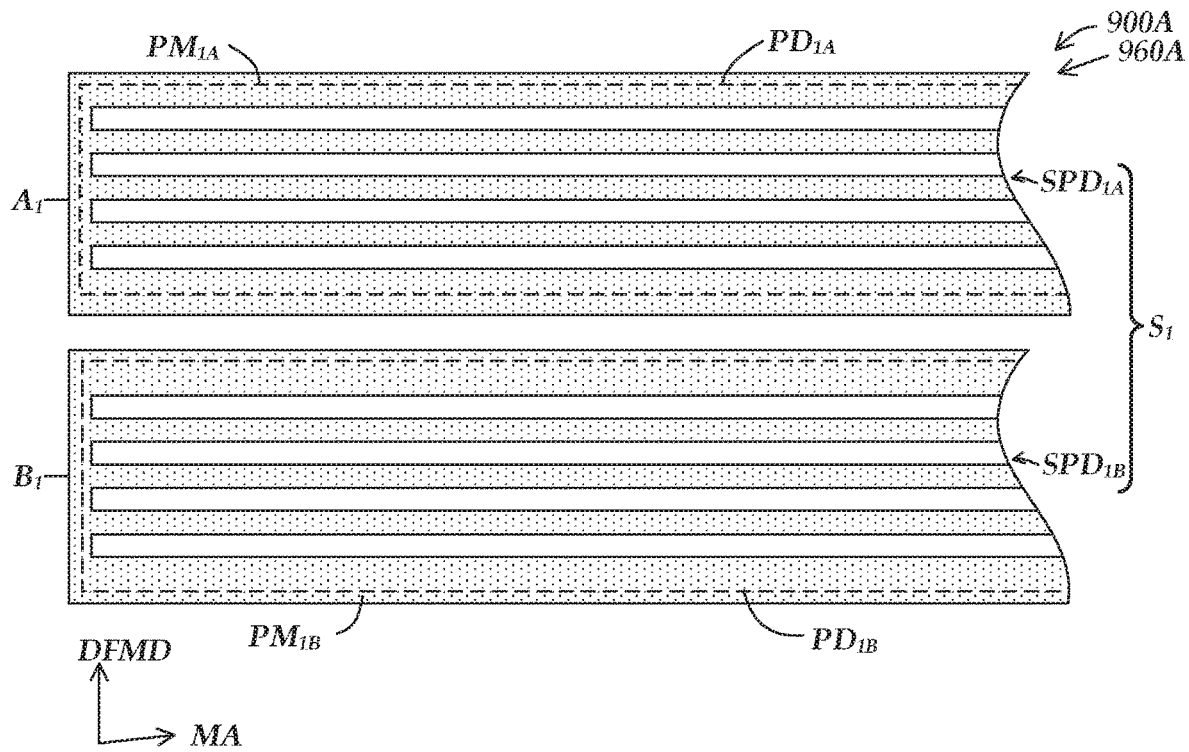
FIG. 9A is a detailed schematic diagram of a section of another exemplary photodetector configuration of a contamination and defect resistant optical encoder which is similar to the photodetector configuration shown in FIG. 8.
Figure 9B:
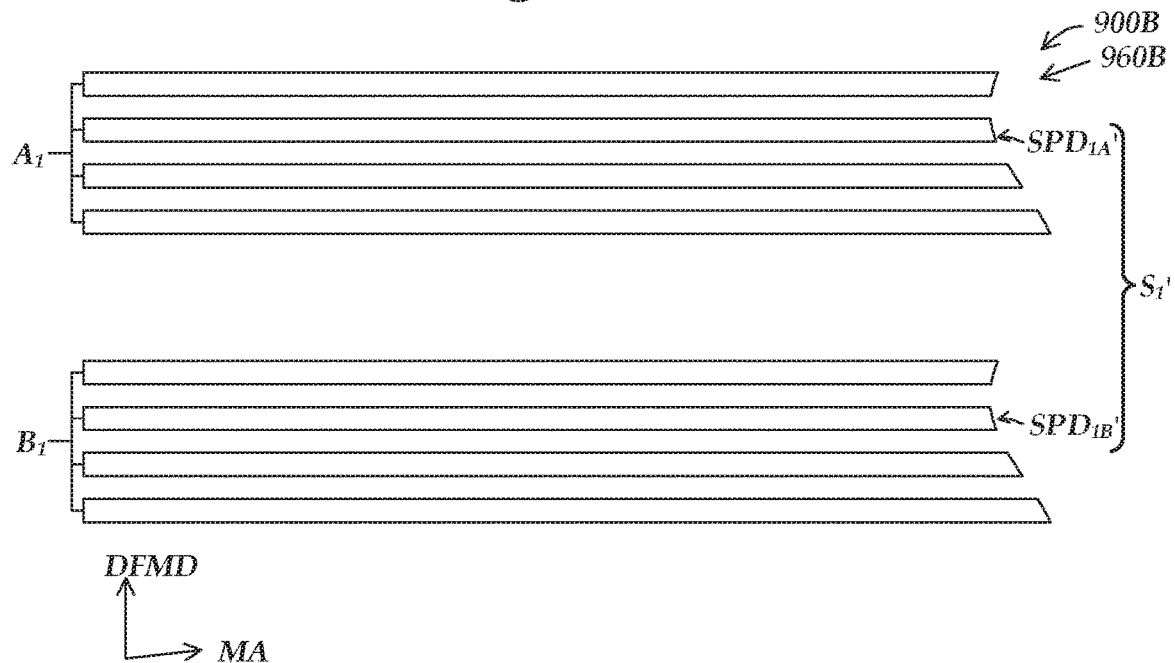
FIG. 9B is a detailed schematic diagram of a section of another exemplary photodetector configuration of a contamination and defect resistant optical encoder which is similar to the photodetector configuration shown in FIG. 8.

The photodetector configuration 560 comprises a set of N spatial phase detectors arranged periodically at a detector pitch PD (shown in FIG. 6A and FIG. 6B) along a detected fringe motion direction DFMD transverse to the measuring axis direction MA, wherein each spatial phase detector is configured to provide a respective spatial phase detector signal and at least a majority of the respective spatial phase detectors extend over a relatively longer dimension along the measuring axis direction MA and are relatively narrow along the detected fringe motion direction DFMD transverse to the measuring axis, and the set of N spatial phase detectors are arranged in a spatial phase sequence along the detected fringe motion direction DFMD, as described in greater detail below with reference to FIGS. 8, 9A and 9B.

The scale 510 is configured to input the illumination fringe pattern at the illumination region IR and output scale light components along a scale light path SCLP to form the detector fringe pattern 535 at the photodetector configuration 560. The detector fringe pattern 535 comprises periodic high and low intensity bands that extend over a relatively longer dimension along the measuring axis direction MA and are relatively narrow and periodic with a detected fringe period PDF along the detected fringe motion direction DFMD transverse to the measuring axis direction MA, as described in greater detail below with reference to FIG. 6. As a way of describing their orientation, the bands extend over a relatively longer dimension along the measuring axis direction MA, but in various implementations this does not mean they are required to be aligned along the measuring axis direction. In various exemplary implementations, the bands may be aligned at a moderate or small angle relative to the measuring axis direction, as explained below with reference to FIG. 6.

The detected fringe period PDF and the detected fringe motion direction DFMD transverse to the measuring axis direction MA depend at least partially on the nonzero illumination fringe yaw angle $\psi$, as outlined below with reference to FIG. 7. The high and low intensity bands move along the detected fringe motion direction DFMD transverse to the measuring axis direction MA as the scale 510 displaces along the measuring axis direction MA. The photodetector configuration 560 is configured to detect a displacement of the high and low intensity bands along the detected fringe motion direction DFMD transverse to the measuring axis direction MA and provide respective spatial phase displacement signals that are indicative of the scale displacement.

In the implementation shown in FIG. 5, the structured illumination generating portion 533 comprises a first illumination source light diffraction grating 540 and a second illumination source light diffraction grating 550. In some implementations, the first illumination source light diffraction grating 540 and the second illumination source light diffraction grating 550 may be phase gratings. Phase gratings provide better power efficiency by reducing light loss.

A contamination and defect resistant optical encoder configured according to the principles described with respect to FIG. 5 through FIG. 9B will provide a simple design which may be tolerant to contaminants (e.g., wirebonding contamination) which are as large as 100 micrometers and scale defects which are as large as 300 micrometers. Contaminants or defects on a scale that are similar in size or larger than the detection fringe period will typically produce a common mode error component on adjacent spatial phase detectors which may be canceled out in signal processing (e.g., quadrature processing). That is, the effect of contamination moving along the measuring axis direction will tend to be shared across adjacent spatial phase detectors, and will move along the measuring axis direction on those adjacent spatial phase detectors as the scale or readhead configuration displace along the measuring axis direction. Because the contamination effect is a common mode effect across adjacent spatial phase detectors, and because the spatial phase detectors are relatively elongated over a dimension along the measuring axis direction that may substantially exceed the size of the contamination effect, the effect of the contamination on the displacement signal accuracy may be substantially mitigated. Another advantage is that in the case of any residual non-common mode error, as the photodetector configuration 560 displaces relative to the scale 510, portions of the detector fringe pattern 535 corresponding to a defect will move very slowly from one spatial phase detector to another, which allows for more effective compensation of spatial phase displacement signals. Such an encoder does not require complex signal processing to provide tolerance to contamination and defects. Spatial phase displacement signals provided by the set of N spatial phase detectors may be processed according to standard techniques known to one skilled in the art.

Figure 6A:
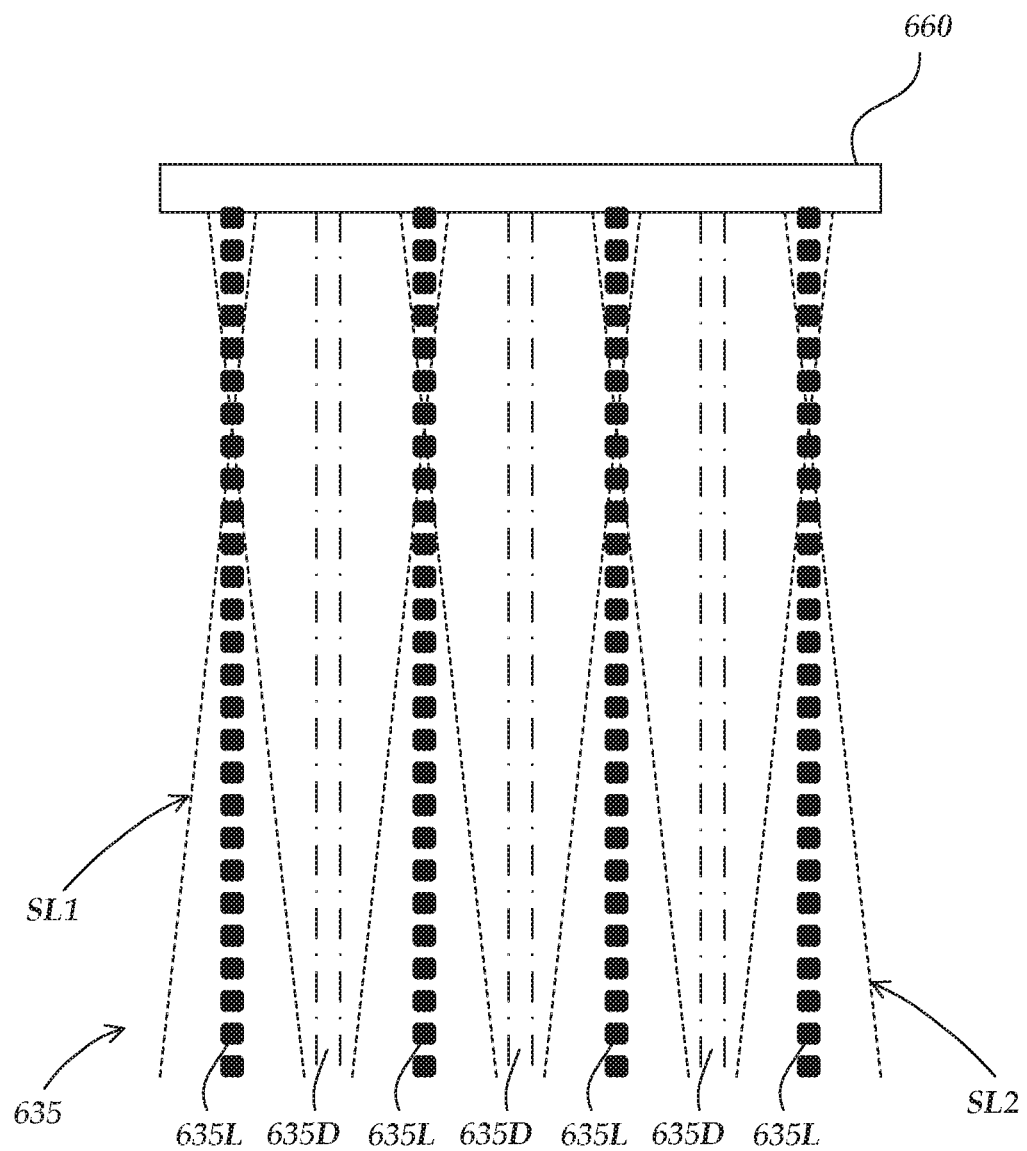
FIG. 6A is a schematic diagram representing a first view of scale light components that form a detector fringe pattern proximate to a photodetector configuration including spatial phase detectors that are elongated approximately along the measuring axis direction and arranged periodically transverse to the measuring axis direction.

FIG. 6A is a diagram schematically representing a first view of scale light components SL1 and SL2 that form a detector fringe pattern 635 similar or identical to the detector fringe pattern 535 shown proximate to a photodetector configuration 660 which is similar to the photodetector configuration 560 in FIG. 5. The detector fringe pattern 635 may be provided by an optical encoder similar to the optical encoder configuration 500 outlined with reference to FIG. 5. FIG. 6A shows a cross section of the scale light which forms the detector fringe pattern 635 in a plane defined by a measuring axis direction MA and a scale light path SCLP as previously shown with respect to FIG. 5. As shown in FIG. 6A, the scale light components comprise a first scale light component SL1 and a second scale light component SL2 (indicated by dashed lines representing high intensity bands) which each comprise parallel rays, where the parallel rays of the first scale light component SL1 are along a direction with an opposite angular orientation with respect to the scale light path SCLP. The first scale light component SL1 and the second scale light component SL2 overlap to form the detector fringe pattern 635, according to known principles. The first scale light component SL1 and second scale light component SL2 may be formed from different diffractive orders from a structured illumination generating portion. The detector fringe pattern 635 comprises dark or low intensity interference bands 635D indicated by bold lines, and light or high intensity interference bands 635L indicated by dashed outlines.

Figure 6B:
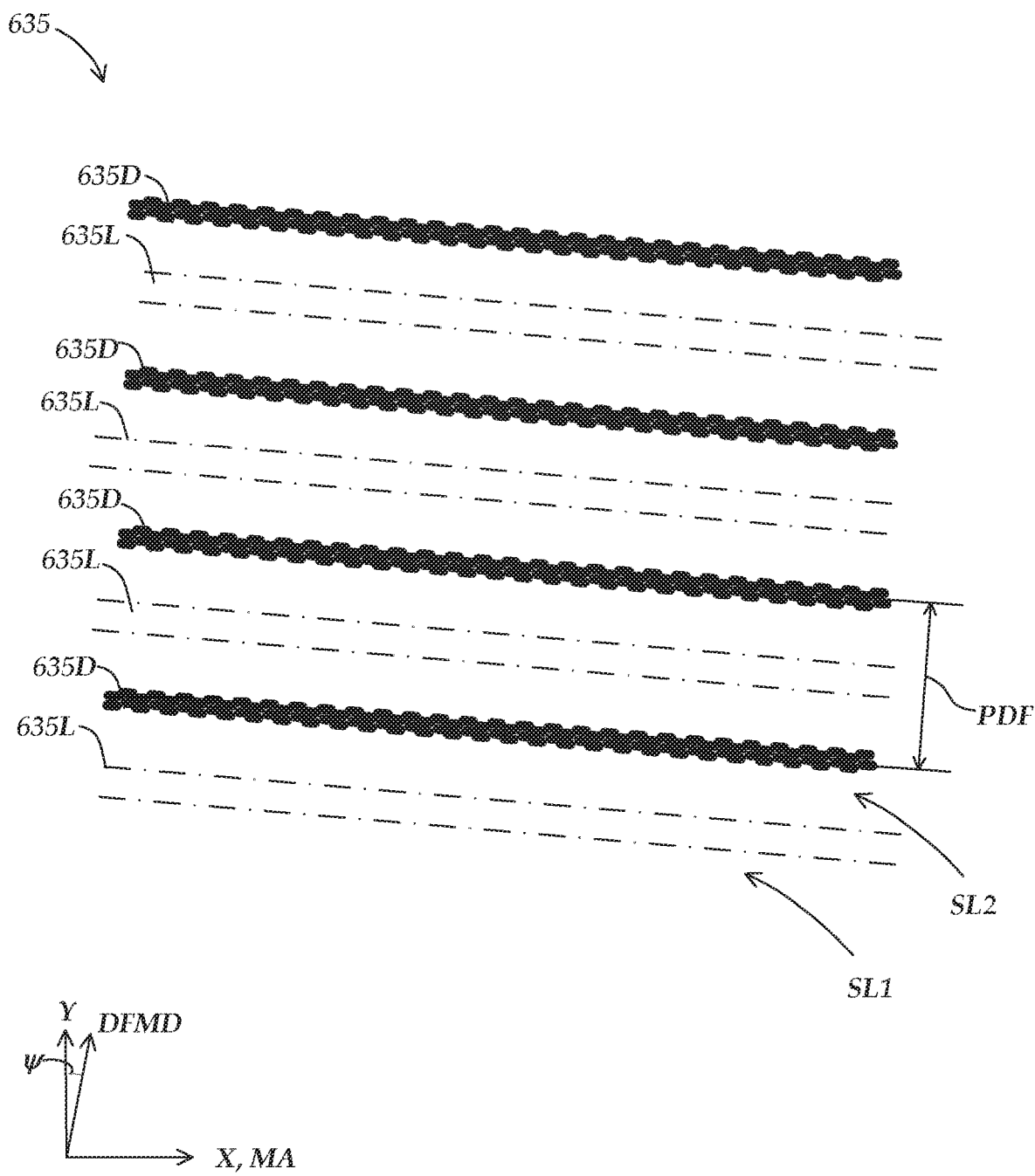
FIG. 6B is a schematic diagram representing a second view of scale light components that form a detector fringe pattern proximate to a photodetector configuration including spatial phase detectors that are elongated approximately along the measuring axis direction and arranged periodically transverse to the measuring axis direction.

FIG. 6B is a diagram schematically representing a second view of scale light components SL1 and SL2 that form the fringe pattern 635. FIG. 6B shows a cross section of the detector fringe pattern 635 in a plane defined by a measuring axis direction MA and a Y direction as previously shown with respect to FIG. 5, which is proximate to the photodetector configuration 660. The detector fringe pattern 635 comprises dark or low intensity interference bands 635D indicated by bold lines and light or high intensity interference bands 635L indicated by dashed outlines, which are periodic with a detected fringe period PDF along the detected fringe motion direction DFMD, as shown in FIG. 6B. The detected fringe motion direction is generally transverse to the direction of the interference bands 635D and 635L, with a slight rotation equal to the nonzero illumination fringe yaw angle ψ relative to the Y direction.

Figure 7:
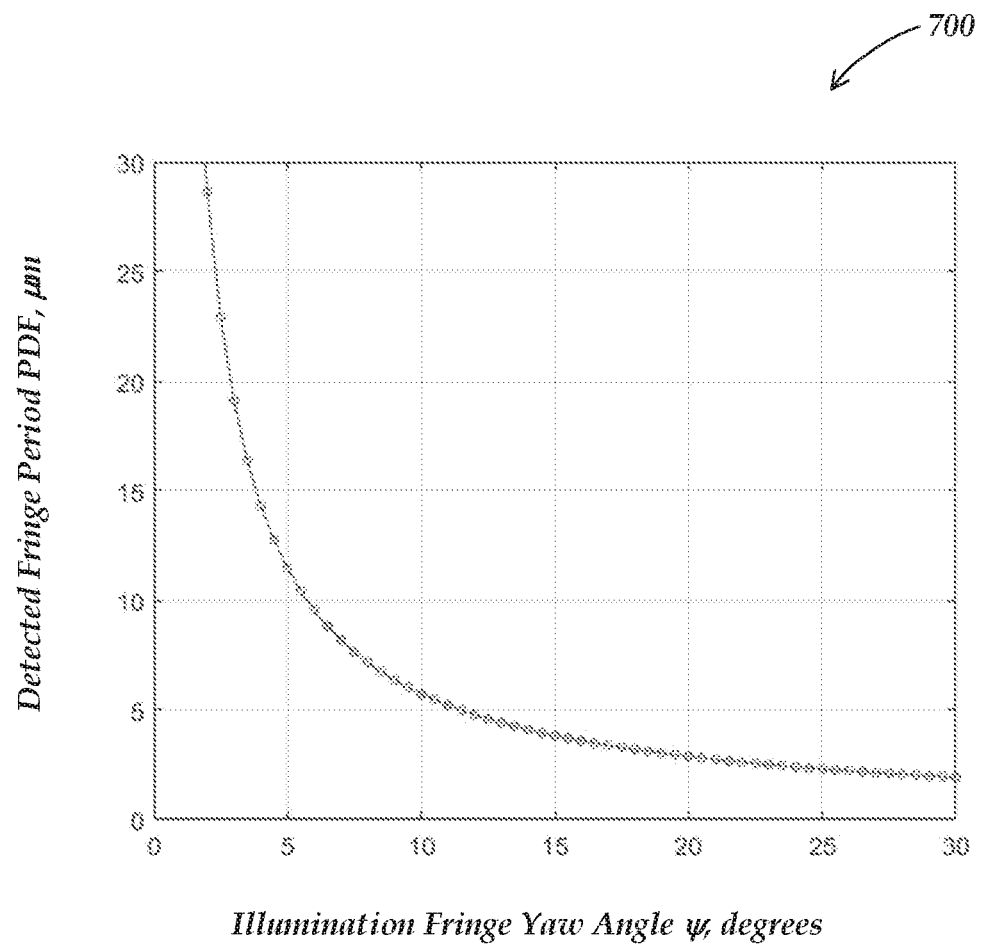
FIG. 7 is a graph of properties of a contamination and defect resistant optical encoder similar to the optical encoder represented in FIG. 5 and FIG. 6, including a detected fringe period versus an illumination fringe yaw angle.

FIG. 7 is a graph 700 of properties of a contamination and defect resistant optical encoder similar to the optical encoder configuration 500 represented in FIG. 5 and FIG. 6, including a detected fringe period PDF versus an illumination fringe yaw angle ψ. The graph 700 shows data for a contamination and defect resistant optical encoder which comprises a structured illumination generating portion with a first illumination source light diffraction grating having a grating pitch $P_1$, a second illumination source light diffraction grating having a pitch $P_2$, and a scale having a scale pitch $P_{SF}$, which satisfies the expression:

$$\frac{1}{P_2} - \frac{1}{P_1} = \frac{1}{P_{SF}} \quad (1)$$

The detected fringe period PDF then relates to the illumination fringe yaw angle ψ by the expression:

$$PDF = \frac{P_{SF}}{4\sin(\psi/2)} \quad (2)$$

It is generally desirable for a contamination and defect resistant optical encoder to be configured such that the detected fringe period PDF is large (e.g., greater than 7 micrometers, or in some implementations, greater than 40 micrometers), which requires a small value of the illumination fringe yaw angle ψ(e.g., less than 7 degrees). A larger detected fringe period PDF provides better tolerance to measurement errors from misalignment between a scale, a photodetector configuration, and an illumination source. Errors arising from pitch and roll of a scale relative to an illumination source and/or a photodetector configuration are inversely proportional to the detected fringe period PDF. Therefore, a larger detected fringe period PDF will provide better robustness to measurement errors caused by scale waviness.

FIG. 8 is a schematic diagram 800 of one exemplary photodetector configuration 860 usable in a contamination and defect resistant optical encoder which is similar to the optical encoder configuration 500 represented in FIG. 5 and FIG. 6, wherein the photodetector configuration includes spatial phase detectors that are elongated approximately or roughly along the measuring axis direction and arranged periodically transverse to the measuring axis direction. Similar references numbers 8XX in FIGS. 8 and 5XX in FIG. 5 may refer to similar elements unless otherwise indicated by context or description.

The photodetector configuration 860 comprises a set of N spatial phase detectors arranged in a spatial phase sequence along the detected fringe motion direction DFMD, where N is an integer that is at least 6 and the spatial phase sequence comprises two outer spatial phase detectors at a start and end of the sequence along the direction transverse to the measuring axis direction MA and an interior group of spatial phase detectors located between the two outer spatial phase detectors. Each spatial phase detector in the interior group is preceded and followed in the spatial phase sequence by spatial phase detectors that have respective spatial phases that are different from that spatial phase detector and different from each other. Each spatial phase detector comprises scale light receptor areas that are spatially periodic along the detected fringe motion direction DFMD and positioned corresponding to a respective spatial phase of that spatial phase detector relative to the periodic scale light pattern. Each spatial phase detector in the interior group is preceded and followed in the spatial phase sequence by spatial phase detectors that have respective spatial phases that are different from that spatial phase detector and different from each other.

In some implementations, the set of N spatial phase photodetectors may comprise at least M subsets of spatial phase detectors, where M is an integer that is at least 2, and wherein each of the M subsets includes spatial phase detectors that provide each of the respective spatial phases included in the set of N spatial phase photodetectors. In some implementations, M may be at least 4. In some implementations, M may be at least 6. In some implementations, each of the M subsets of spatial phase detectors may comprise spatial phase detectors that provide the same respective spatial phases arranged in the same subset spatial phase sequence. FIG. 8 shows an implementation with M subsets of spatial phase detectors indicated as $S_1$ through $S_M$. The subset $S_1$ comprises spatial phase detectors $SPD_{1A}$, $SPD_{1B}$, $SPD_{1C}$, and $SPD_{1D}$. The subset $S_2$ comprises spatial phase detectors $SPD_{2A}$, $SPD_{2B}$, $SPD_{2C}$, and $SPD_{2D}$. The subset $S_M$ comprises spatial phase detectors $SPD_{MA}$, $SPD_{MB}$, $SPD_{MC}$, and $SPD_{MD}$.

In the implementation shown in FIG. 8, the spatial phase sequence is indicated by spatial phase detectors including subscript indices A, B, C, and D (e.g., the spatial phase detectors $SPD_{1A}$, $SPD_{1B}$, $SPD_{1C}$, and $SPD_{1D}$). The spatial phase detectors with subscript indices A and D are the two outer spatial phase detectors at the start and end of each instance of the spatial phase sequence. The spatial phase detectors with subscript indices B and C are the interior groups.

The spatial phase detectors $SPD_{1A}$, $SPD_{1B}$, $SPD_{1C}$, and $SPD_{1D}$ output respective spatial phase detector signals $A_1$, $B_1$, $C_1$, and $D_1$. The spatial phase detectors $SPD_{2A}$, $SPD_{2B}$, $SPD_{2C}$, and $SPD_{2D}$ output respective spatial phase detector signals $A_2$, $B_2$, $C_2$, and $D_2$. The spatial phase detectors $SPD_{MA}$, $SPD_{MB}$, $SPD_{MC}$, and $SPD_{MD}$ output respective spatial phase detector signals $A_M$, $B_M$, $C_M$, and $D_M$.

In some implementations, such as the implementation shown in FIG. 8, N is at least 8 and each subset of spatial phase detectors may comprise four spatial phase detectors having respective spatial phases separated by 90 degrees. In alternative implementations, each subset of spatial phase detectors may comprise three spatial phase detectors having respective spatial phases separated by 120 degrees.

In the implementation shown in FIG. 8, the photodetector configuration 860 includes connections configured to combine spatial phase detector signals corresponding to the same respective spatial phase and to output each such combination as a respective spatial phase position signal. The photodetector configuration 860 is configured to output four spatial phase position signals corresponding to spatial phases separated by 90 degrees. Spatial phase signals with the same letter designation (e.g., $A_1$, $A_2$, and $A_M$) are combined (e.g., summed) to provide spatial phase signals $\Sigma A$, $\Sigma B$, $\Sigma C$, and $\Sigma D$. In alternative implementations, a photodetector configuration may be configured to output three spatial phase position signals corresponding to spatial phases separated by 120 degrees. In either case, spatial phase position signals may be further utilized to determine displacement signals, e.g., through quadrature or three phase signal processing.

In some implementations, a separation distance YSEP between the scale light receptor areas of each adjacent pair of the N spatial phase detectors along the detected fringe motion direction DFMD may be at most 25 micrometers. In some implementations, the separation distance YSEP between the scale light receptor areas of each adjacent pair of the N spatial phase detectors is the same along the detected fringe motion direction DFMD.

FIG. 8 additionally shows a detector axis DA in relation to the measuring axis direction MA. The detector axis is a direction parallel to the specific elongation direction of the spatial phase detectors. In general, it is desirable that the detector axis DA is orthogonal (or close to orthogonal) to the detected fringe motion direction DFMD, although it is not required that it be precisely so, subject to the condition that good displacement signals may be obtained. Therefore, in some implementations the detector axis may be rotated with respect to the measuring axis direction MA by an angle α, particularly if the detected fringe motion direction DFMD is not perpendicular to the measuring axis direction MA. Since it is desirable to use a small illumination fringe yaw angle ψ (as described with respect to FIG. 7), the angle α may be rather small, and in some cases with a very small value of the illumination fringe yaw angle ψ, it may not even be necessary to rotate the detector axis DA with respect to the measuring axis direction MA.

FIG. 9A is a detailed schematic diagram of a section of another exemplary photodetector configuration 960A of a contamination and defect resistant optical encoder 900A which is similar to the photodetector configuration shown in FIG. 8. For simplicity, FIG. 9A only shows one subset of spatial phase detectors $S_1$ with two spatial phase detectors $SPD_{1A}$ and $SPD_{1B}$. It should be appreciated that the photodetector configuration 960A may comprise more spatial phase detectors according to the principles disclosed herein, but only two are shown for simplicity. In the implementation shown in FIG. 9A, each of the N spatial phase detectors (e.g., spatial phase detectors $SPD_{1A}$ and $SPD_{1B}$) comprises a photodetector (e.g., photodetectors $PD_{1A}$ and $PD_{1B}$ indicated by dashed lines) covered by a spatial phase mask (e.g., phase masks $PM_{1A}$ and $PM_{1B}$) that blocks the photodetector from receiving the periodic scale light pattern except through openings included in the spatial phase mask. In this case, the scale light receptor areas comprise areas of the photodetectors (e.g., the photodetectors $PD_{1A}$ and $PD_{1B}$) that are exposed through the openings in the respective spatial phase masks (e.g., the spatial phase masks $PM_{1A}$ and $PM_{1B}$). In the implementation shown in FIG. 9A, the scale light receptor areas (i.e., the openings) of the phase mask $PM_{1B}$ are offset relative to the scale light receptor areas of the phase mask $PM_{1A}$ along the detected fringe motion direction DFMD by 90 degrees. It should be appreciated that while the spatial phase masks $PM_{1A}$ and $PM_{1B}$ are schematically illustrated as separate portions in FIG. 9A, in some implementations, they may be conveniently constructed with the same material in the same process to eliminate any potential positioning errors.

FIG. 9B is a detailed schematic diagram of a section of another exemplary photodetector configuration 960B of a contamination and defect resistant optical encoder 900B which is similar to the photodetector configuration 860 shown in FIG. 8. For simplicity, FIG. 9B only shows one subset of spatial phase detectors $S_1'$ with two spatial phase detectors $SPD_{1A}'$ and $SPD_{1B}'$. It should be appreciated that the photodetector configuration 960B may comprise more spatial phase detectors according to the principles disclosed herein, but only two are shown for simplicity. In the implementation shown in FIG. 9B, each of the N spatial phase detectors (e.g., spatial phase detectors $SPD_{1A}'$ and $SPD_{1B}'$) comprises a periodic array of electrically interconnected photodetector areas that receive the periodic scale light pattern. In this case, the scale light receptor areas comprise the photodetector areas of the periodic array of photodetectors. In the implementation shown in FIG. 9B, the photodetector areas of the spatial phase detector $SPD_{1B}'$ are offset relative to the photodetector areas of the spatial phase detector $SPD_{1A}'$ along the detected fringe motion direction DFMD by 90 degrees of spatial phase shift.

In some implementations of photodetectors which are similar to the photodetector configurations 960A or 960B, it is advantageous for each of the N spatial phase detectors to comprise an even number of scale light receptor areas. Zero order components of scale light may cause a variation in intensity between alternating fringes within the scale light. Therefore, having an even number of scale light receptor areas will average out this variation.

Figure 10:
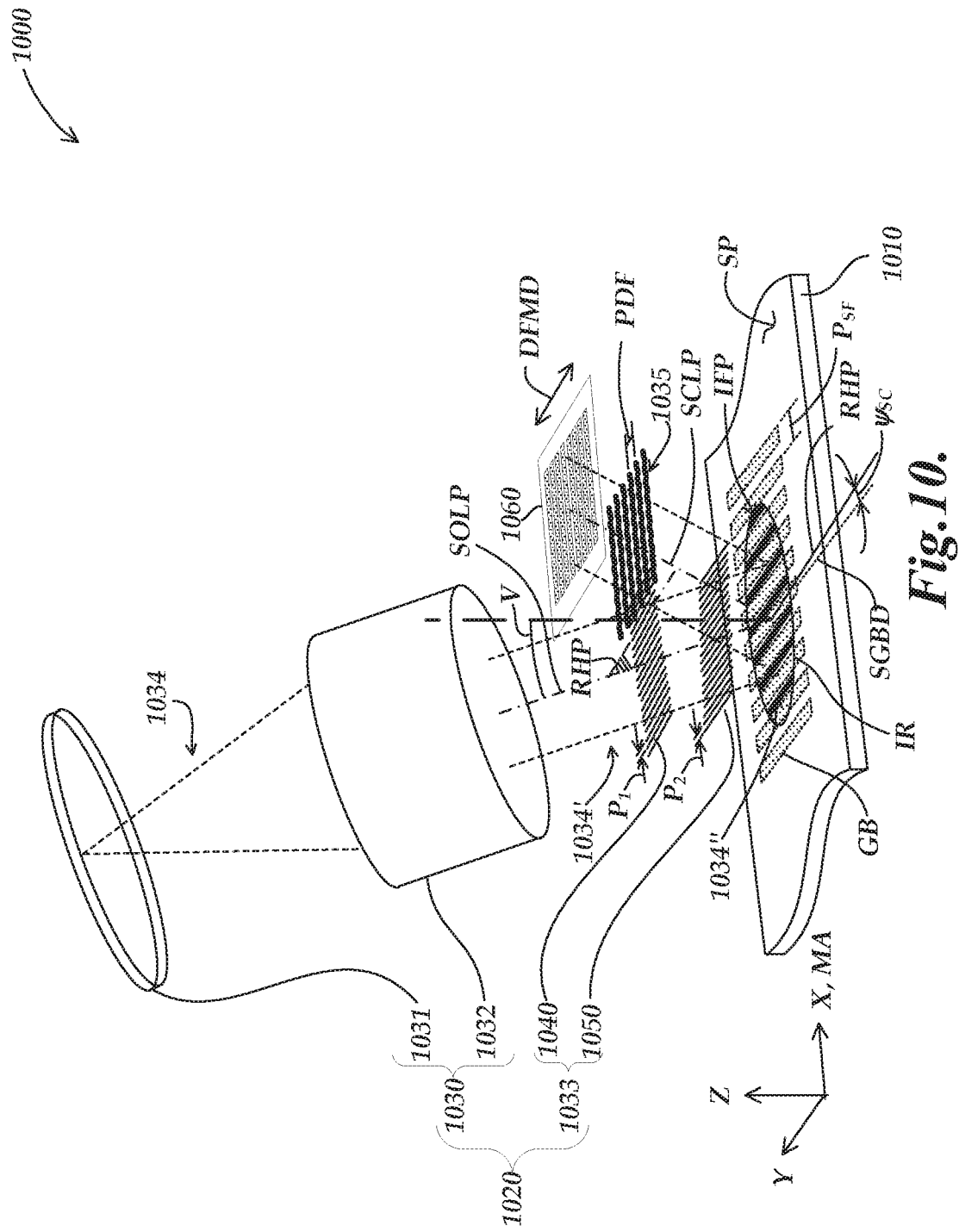
FIG. 10 is a partially schematic diagram of an additional implementation of a contamination and defect resistant optical encoder configuration.

FIG. 10 is a partially schematic diagram of an additional implementation of a contamination and defect resistant optical encoder configuration 1000 for providing displacement signals. In the encoder configuration 1000, the periodic scale light pattern 1035 that is detected comprises a detector fringe pattern 1035, which includes bands that are oriented to extend over a relatively longer dimension along a measuring axis direction MA, and that move transverse to the measuring axis direction along a detected fringe motion direction DFMD during optical encoder displacement.

The optical encoder configuration 1000 comprises a scale 1010, an illumination source 1020, and a photodetector configuration 1060. The scale 1010 extends along a measuring axis direction MA, and comprises a scale grating comprising grating bars GB arranged in a scale plane SP that is nominally parallel to the measuring axis direction MA. The scale grating bars GB are narrow along the measuring axis direction MA and elongated along a scale grating bar direction SGBD transverse to the measuring axis direction MA, and are arranged periodically at a scale pitch $P_{SF}$ along the measuring axis direction MA. The illumination source 1020 comprises a light source 1030 that outputs light 1034', and a structured illumination generating portion 1033 configured to input the light 1034' and output structured illumination 1034" along a source light path SOLP to an illumination region IR at the scale plane SP, where the structured illumination 1034" comprises an illumination fringe pattern IFP comprising fringes that are narrow along the measuring axis direction MA and elongated along an illumination fringe direction IFD oriented transverse to the measuring axis direction MA. The light source 1030 comprises a point source 1031 and a collimating lens 1032. The point source 1031 outputs light 1034 to the collimating lens which then collimates the light 1034 to provide the light 1034'.

The photodetector configuration 1060 comprises a set of N spatial phase detectors arranged periodically at a detector pitch PD (as shown in detail FIG. 6A and FIG. 6B) along a detected fringe motion direction DFMD transverse to the measuring axis direction MA, wherein each spatial phase detector is configured to provide a respective spatial phase detector signal and at least a majority of the respective spatial phase detectors extend over a relatively longer dimension along the measuring axis direction MA and are relatively narrow along the detected fringe motion direction DFMD transverse to the measuring axis, and the set of N spatial phase detectors are arranged in a spatial phase sequence along the detected fringe motion direction DFMD, as previously described in greater detail with reference to FIGS. 8, 9A and 9B.

In a similar manner as the encoder configuration 500, the scale 1010 is configured to input the illumination fringe pattern at the illumination region IR and output scale light components along a scale light path SCLP to form the detector fringe pattern 1035 at the photodetector configuration 1060. The detector fringe pattern 1035 comprises periodic high and low intensity bands that extend over a relatively longer dimension along the measuring axis direction MA and are relatively narrow and periodic with a detected fringe period PDF along the detected fringe motion direction DFMD transverse to the measuring axis direction MA, as previously described in greater detail with reference to FIG. 6.

The scale grating bar direction SGBD is oriented at a nonzero yaw angle $\psi_{SC}$ relative to a readhead plane RHP defined by the source light path SOLP and a scale light path SCLP.

The structured illumination generating portion 1033 comprises a first illumination source diffraction grating 1040 and a second illumination source diffraction grating 1050, which are shown in more detail in FIG. 11A and FIG. 11B. In some implementations, the first illumination source diffraction grating 1040 and the second illumination source diffraction grating 1050 may be phase gratings.

The detected fringe period PDF and the detected fringe motion direction DFMD transverse to the measuring axis direction MA depend at least partially on the nonzero yaw angle $\psi_{SC}$, as outlined previously with reference to FIG. 7. The high and low intensity bands move along the detected fringe motion direction DFMD transverse to the measuring axis direction MA as the scale 1010 displaces along the measuring axis direction MA. The photodetector configuration 1060 is configured to detect a displacement of the high and low intensity bands along the detected fringe motion direction DFMD transverse to the measuring axis direction MA and provide respective spatial phase displacement signals that are indicative of the scale displacement.

FIG. 11A is a schematic diagram of the first illumination source diffraction grating 1040. FIG. 11B is a schematic diagram of the second illumination source diffraction grating 1050. In various implementations, it is desirable to configure the optical encoder configuration 1000 to minimize errors in displacement signals that arise from gap variations between the scale 1010, the illumination source 1020, and the photodetector configuration 1060.

As shown in FIG. 11A, the first illumination source diffraction grating 1040 comprises first index grating bars arranged periodically at a first index pitch $P_1$ in a first index plane, wherein the first index grating bars are narrow along the measuring axis direction, and elongated along a first index grating bar direction which is transverse to the measuring axis direction and rotated by an angle $\psi_1$ with respect to the readhead plane RHP. As shown in FIG. 11B, the second illumination source diffraction grating 1050 comprises second index grating bars arranged periodically at a second index pitch $P_2$ in a second index plane which is parallel to the first index plane, wherein the second index grating bars are narrow along the measuring axis direction, and elongated along a second index grating bar direction which is transverse to the measuring axis direction and rotated by an angle $\psi_2$ with respect to the readhead plane RHP.

In various optical encoders such as the optical encoder configuration 500, dynamic gap errors may arise from scale waviness, which changes a distance between the illumination portion 520 and the scale 510 along the source light path SOLP. A change in an optical path length along the scale light path SCLP causes changes in the relative phases of interfering beams which contribute to the detector fringe pattern 1035. In various applications, angles $\psi_1$ and $\psi_2$ may be selected such that they give a dynamic gap error which is equal in magnitude and opposite in sign. The phases of two interfering rays of interfering beams which contribute to the detector fringe pattern 1035 may be expressed by $\Phi_+$ and $\Phi_-$. The light output by the light source 1030 has a wavelength $\lambda$. A dynamic gap error DGE relates to a gap variation $\Delta g$ along a direction normal to the measuring axis direction MA and the scale grating bar direction SGBD (i.e., the Z direction) by the expression:

$$DGE = \frac{P_{SF}}{4\pi} \frac{\partial (\Phi_+ - \Phi_-)}{\partial \Delta g} \quad (3)$$

More specifically, the differential term is given by the expression $$\frac{\partial (\Phi_+ - \Phi_-)}{\partial \Delta g} = \Omega \left[ \frac{-\lambda}{P_1} \sin(\psi_1) + \frac{\lambda}{P_2} \sin(\psi_2) \right] - \frac{4\pi}{P_{SF}} \sin(\psi_{sc}) \tan(V) \quad (4)$$

where a factor $\Omega$ is defined by the expression:

$$\Omega = \frac{4\pi\lambda}{P_{SF}^2} \sin(V) \left( \left( \cos^2(V) - \frac{\lambda^2}{P_{SF}^2} \right)^{-3/2} - \cos^{-3}(V) \right) + \frac{8\pi}{\lambda} \tan(V). \quad (5)$$

In equation 4, the first term $$\Omega \left[ \frac{-\lambda}{P_1} \sin(\psi_1) + \frac{\lambda}{P_2} \sin(\psi_2) \right]$$

is an error component that comes from the yaw of each of the first illumination source diffraction grating 1040 and the second illumination source diffraction grating 1050. The second term $$\frac{4\pi}{P_{SF}} \sin(\psi_{sc}) \tan(V)$$

is an error component that comes from the yaw angle $\psi_{SC}$. By deliberately introducing error components with the angle $\psi_1$ and the angle $\psi_2$, it is possible to compensate error components from the second term.

In some implementations, the scale 1010 comprises a scale grating which is a reflective grating. As shown in FIG. 10, the source light path SOLP may be oriented at an angle V with respect to a direction normal to the scale plane. In order to provide the desired detected fringe period PDF, the yaw angle $\psi_{SC}$ may satisfy the expression:

$$\psi_{sc} = \sin^{-1} \left[ P_{SF} \left( \frac{1}{2PDF} - \frac{\sin(\psi_1)}{P_1} + \frac{\sin(\psi_2)}{P_2} \right) \right]. \quad (6)$$

In order to cancel out the dynamic gap error DGE as shown in equation 3, the angle $\psi_1$ and the angle $\psi_2$ may satisfy the expression:

$$\frac{-\sin(\psi_1)}{d_1} + \frac{\sin(\psi_2)}{d_2} = \frac{2\pi \tan(V) \cos(V)}{PDF(\Omega\lambda - 4\pi \tan V)} \quad (7)$$

In a typical example of an optical encoder configured in a similar manner as the optical encoder configuration 500 with a $P_{SF}$ value of 2 micrometers, a $P_1$ value of 2 micrometers, a $P_2$ value of 1 micrometer, a V value of 30 degrees, a $\lambda$ value of 660 nanometers, and a PDF value of 120 micrometers, $\psi_{SC}$ may then have a value of 0.48 degrees. This may give a dynamic gap error of 4.8 nanometers of position measurement error per micrometer of gap variation $\Delta g$. In a typical example of an optical encoder configured in a similar manner as the optical encoder configuration 1000, with the same parameters as above, $\psi_{SC}$ may be 0.94 degrees, $\psi_1$ may be −0.46 degrees, and $\psi_2$ may be 0.0 degrees. The yaw angle $\psi_1$ may contribute a dynamic gap error component of −9.4 nanometers of position measurement error per micrometer of gap variation $\Delta g$, and the yaw angle $\psi_2$ may contribute a dynamic gap error component of 9.4 nanometers of position measurement error per micrometer of gap variation $\Delta g$. The two dynamic gap errors balance out to provide a net zero dynamic gap error.

Figure 12:
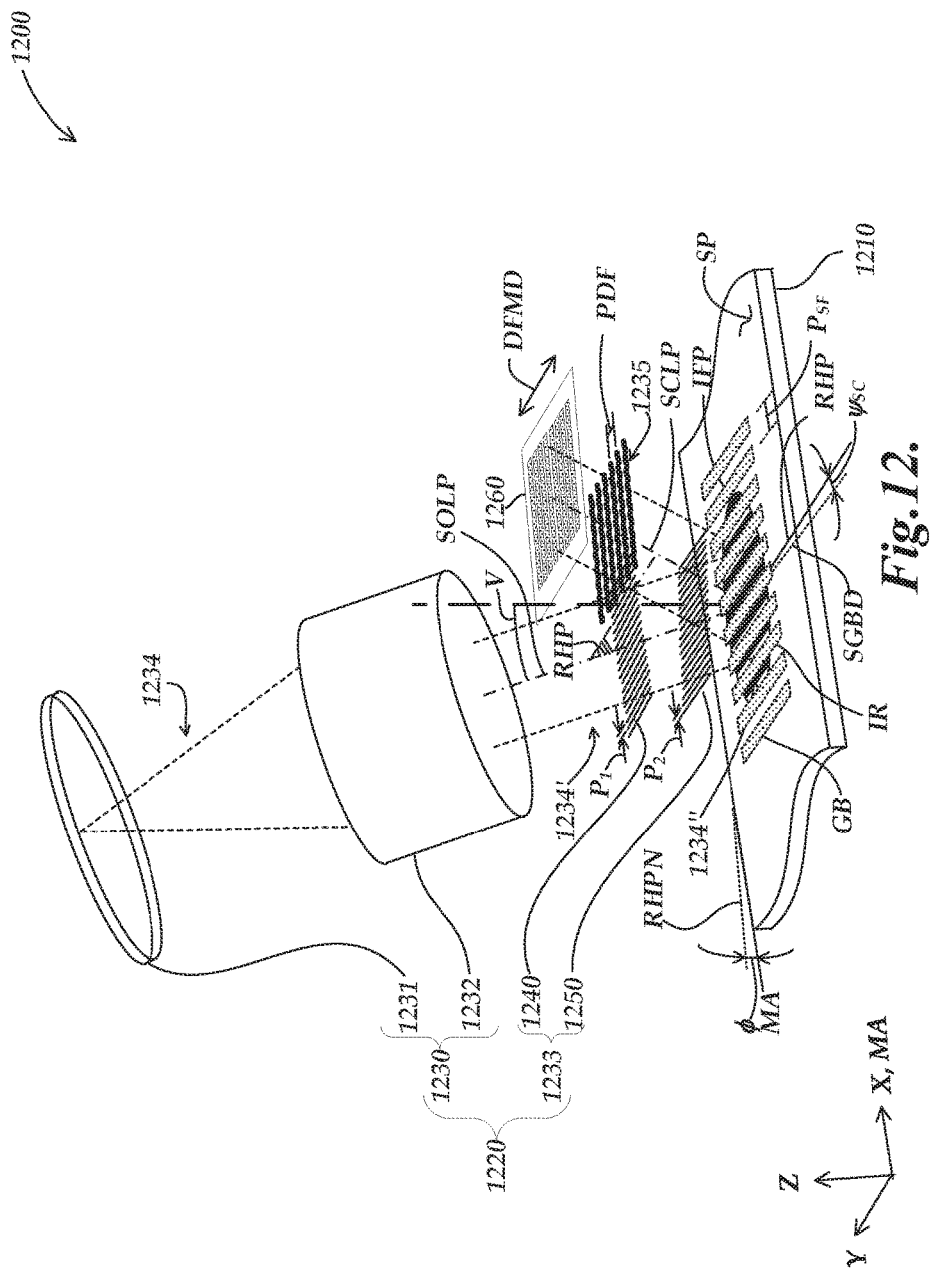
FIG. 12 is a partially schematic diagram of an additional implementation of a contamination and defect resistant optical encoder configuration.

FIG. 12 is a partially schematic diagram of an additional implementation of a contamination and defect resistant optical encoder configuration 1200 for providing displacement signals. In the encoder configuration 1200, the periodic scale light pattern 1235 that is detected comprises a detector fringe pattern, which includes bands that are oriented to extend over a relatively longer dimension along a measuring axis direction MA, and that move transverse to the measuring axis direction MA along a detected fringe motion direction DFMD during optical encoder displacement. The scale light pattern 1235 may be provided by an optical encoder similar to the optical encoder configuration 1000 outlined with reference to FIG. 10.

The optical encoder configuration 1200 comprises a scale 1210, an illumination source 1220, and a photodetector configuration 1260. The scale 1210 extends along a measuring axis direction MA, and comprises a scale grating comprising grating bars GB arranged in a scale plane SP that is nominally parallel to the measuring axis direction MA. The scale grating bars GB are narrow along the measuring axis direction MA and elongated along a scale grating bar direction SGBD transverse to the measuring axis direction MA, and are arranged periodically at a scale pitch $P_{SF}$ along the measuring axis direction MA. The illumination source 1220 comprises a light source 1230 that outputs light 1234', and a structured illumination generating portion 1233 configured to input the light 1234' and output structured illumination 1234" along a source light path SOLP to an illumination region IR at the scale plane SP, where the structured illumination 1234" comprises an illumination fringe pattern IFP comprising fringes that are narrow along the measuring axis direction MA and elongated along an illumination fringe direction IFD oriented transverse to the measuring axis direction MA. The light source 1230 comprises a point source 1231 and a collimating lens 1232. The point source 1231 outputs light 1234 to the collimating lens which then collimates the light 1234 to provide the light 1234'.

The photodetector configuration 1260 comprises a set of N spatial phase detectors arranged periodically at a detector pitch PD (similar to the photodetector configuration 860 as shown in detail FIG. 8) along a detected fringe motion direction DFMD transverse to the measuring axis direction MA, wherein each spatial phase detector is configured to provide a respective spatial phase detector signal and at least a majority of the respective spatial phase detectors extend over a relatively longer dimension along the measuring axis direction MA and are relatively narrow along the detected fringe motion direction DFMD transverse to the measuring axis direction MA, and the set of N spatial phase detectors are arranged in a spatial phase sequence along the detected fringe motion direction DFMD, as previously described in greater detail with reference to FIGS. 8, 9A and 9B.

In a similar manner as the encoder configuration 500, the scale 1210 is configured to input the illumination fringe pattern at the illumination region IR and output scale light components along a scale light path SCLP to form the scale light pattern 1235 at the photodetector configuration 1260. The scale light pattern 1235 comprises periodic high and low intensity bands that extend over a relatively longer dimension along the measuring axis direction MA and are relatively narrow and periodic with a detected fringe period PDF along the detected fringe motion direction DFMD transverse to the measuring axis direction MA, as previously described in greater detail with reference to FIG. 6A and FIG. 6B.

The scale grating bar direction SGBD is oriented at a nonzero yaw angle $\psi_{SC}$ relative to a readhead plane RHP defined by the source light path SOLP and a scale light path SCLP.

The detected fringe period PDF and the detected fringe motion direction DFMD transverse to the measuring axis direction MA depend at least partially on the nonzero yaw angle $\psi_{SC}$, as outlined previously with reference to FIG. 7. The high and low intensity bands move along the detected fringe motion direction DFMD transverse to the measuring axis direction MA as the scale 1210 displaces along the measuring axis direction MA. The photodetector configuration 1260 is configured to detect a displacement of the high and low intensity bands along the detected fringe motion direction DFMD transverse to the measuring axis direction MA and provide respective spatial phase displacement signals that are indicative of the scale displacement.

A normal RHPN of the readhead plane RHP is oriented with a non-zero pitch angle φ relative to the measuring axis direction MA.

Figure 13A:
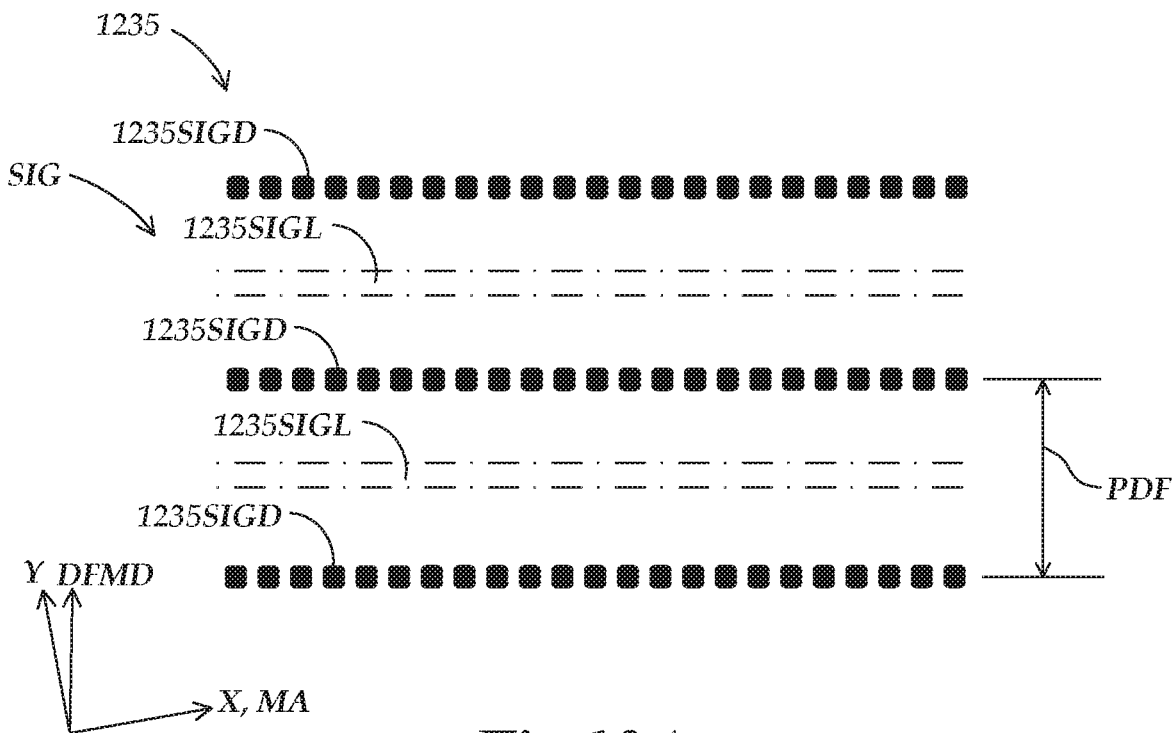
FIG. 13A is a schematic diagram representing a first view of scale light components that form a detector fringe pattern proximate to a photodetector configuration.

FIG. 13A is a schematic diagram representing a first view of scale light components that form a scale light pattern 1235 proximate to a photodetector configuration which is similar to the photodetector configuration 1260 in FIG. 12. More specifically, FIG. 13A shows a cross section of a portion SIG of the scale light pattern 1235 in a plane defined by a measuring axis direction MA and a Y direction, which is proximate to the photodetector configuration 1260. The portion SIG of the scale light pattern 1235 is a set of fringes formed by the overlap of scale light components SL1 and SL2 which may be understood by reference to FIG. 6B. The portion SIG of the scale light pattern 1235 comprises dark or low intensity interference bands 1235SIGD indicated by bold lines and light or high intensity interference bands 1235SIGL indicated by dashed outlines. The portion SIG is analogous to the detector fringe pattern 635, which provides the portion of the scale light pattern 1235 which results in spatial phase displacement signals that are indicative of the scale displacement. More specifically, the photodetector configuration 1260 is configured to detect a displacement of the interference bands 1235SIGD and 1235SIGL along the detected fringe motion direction DFMD transverse to the measuring axis direction MA and provide respective spatial phase displacement signals that are indicative of the scale displacement.

In various implementations, the detector fringe pattern 635 may additionally include zero order light which causes variations in intensity of the high intensity interference bands 635L. More specifically, the interference between zero order scale light and the scale light components SL1 and SL2 results in fringes of low and high intensity interference bands which are parallel to the low intensity interference bands 635D and the high intensity interference bands 635L. This results in fringes in the detector fringe pattern 635 which have a pattern of variation in alternating fringes, which results in short range errors in spatial phase displacement signals. The contamination and defect resistant optical encoder configuration 1200 is configured to suppress these errors as described below. More specifically, the interference between zero order scale light and light which would correspond to the scale light components SL1 and SL2 shown in FIG. 6B results in fringes of dark and light intensity bands which are parallel to light which would correspond to the scale light components SL1 and SL2 and which move along the detected fringe motion direction DFMD during optical encoder displacement It should be appreciated that FIGS. 13A-D show a portion of the scale light pattern 1235 in a frame of reference aligned with the photodetector configuration 1260. In general, a photodetector configuration such as the photodetector configuration 1260 should be oriented such that spatial phase detectors are aligned with the fringe pattern defined by the low and high intensity interference bands 1235SIGD and 1235SIGL along the detected fringe motion direction DFMD, which is transverse to the measuring axis direction MA, but not precisely aligned with the Y direction.

Figure 13B:
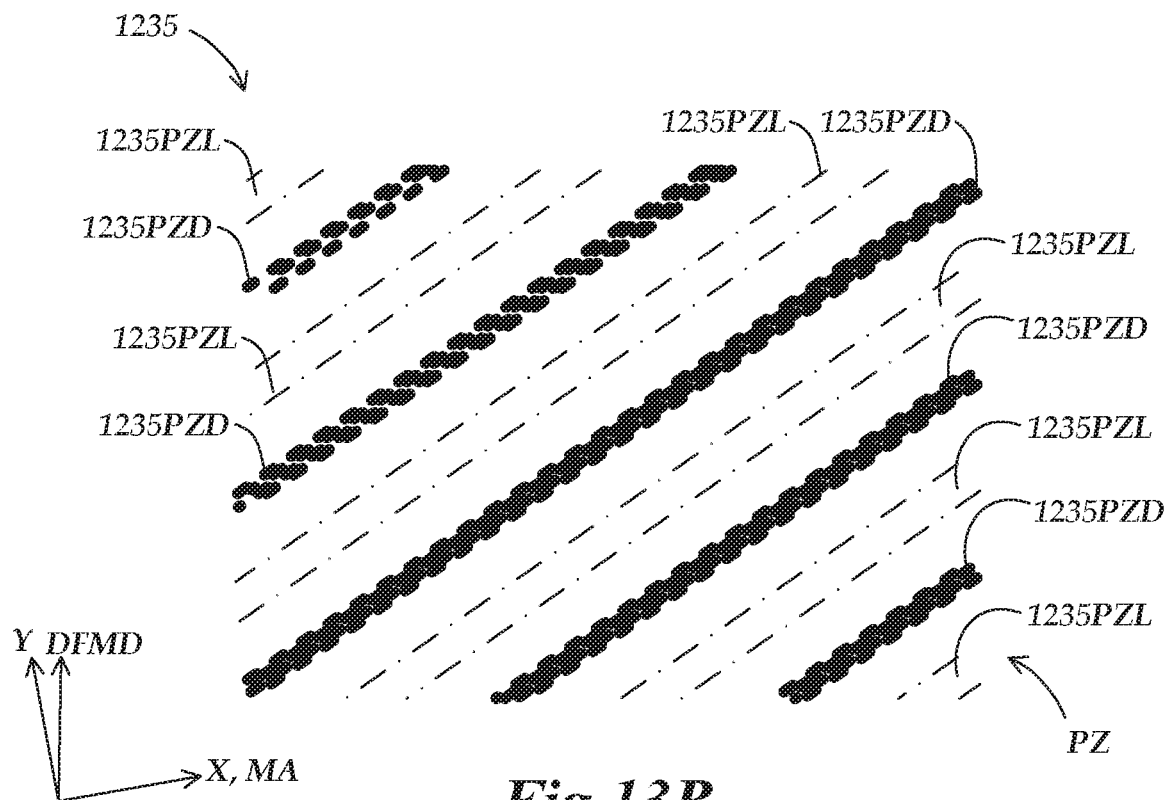
FIG. 13B is a schematic diagram representing a second view of scale light components that form a detector fringe pattern proximate to a photodetector configuration.

FIG. 13B is a schematic diagram representing a second view of scale light components that form a scale light pattern 1235 proximate to a photodetector configuration which is similar to the photodetector configuration 1260 in FIG. 12. More specifically, FIG. 13B shows a cross section of a portion PZ of the scale light pattern 1235 in a plane defined by a measuring axis direction MA and a Y direction, which is proximate to the photodetector configuration 1260. The portion PZ of the scale light pattern 1235 is a set of fringes formed by the overlap of a zero-order scale light component and the scale light component SL1. The portion PZ of the scale light pattern 1235 comprises dark or low intensity interference bands 1235PZD indicated by bold lines and light or high intensity interference bands 1235PZL indicated by dashed outlines.

Because of the non-zero pitch angle φ, the interference bands 1235PZD and 1235PZL are oriented such that they are not aligned along the detected fringe motion direction DFMD, and thus, they are not aligned with the interference bands 1235SIGD and interference bands 1235SIGL.

Figure 13C:
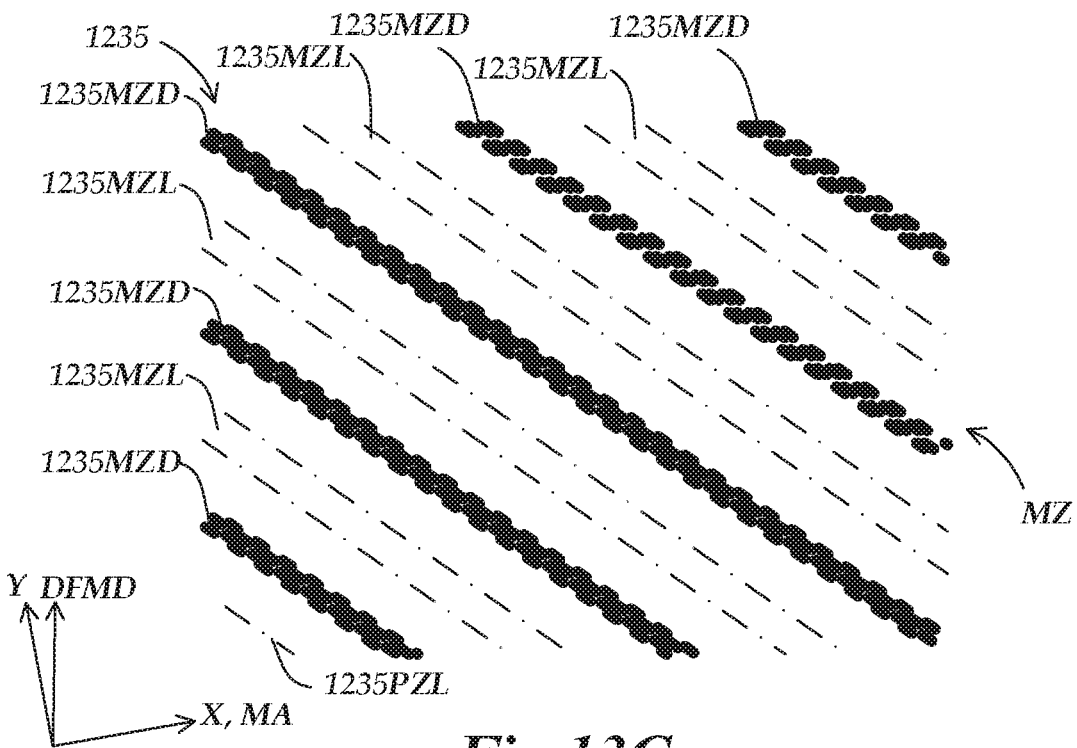
FIG. 13C is a schematic diagram representing a third view of scale light components that form a detector fringe pattern proximate to a photodetector configuration.

FIG. 13C is a schematic diagram representing a third view of scale light components that form a scale light pattern 1235 proximate to a photodetector configuration which is similar to the photodetector configuration 1260 in FIG. 12. More specifically, FIG. 13C shows a cross section of a portion MZ of the scale light pattern 1235 in a plane defined by a measuring axis direction MA and a Y direction, which is proximate to the photodetector configuration 1260. The portion MZ of the scale light pattern 1235 is a set of fringes formed by the overlap of a zero order scale light component and the scale light component SL2. The portion MZ of the scale light pattern 1235 comprises dark or low intensity interference bands 1235MZD indicated by bold lines and light or high intensity interference bands 1235MZL indicated by dashed outlines.

Because of the non-zero pitch angle $\phi$, the interference bands 1235MZD and 1235MZL are oriented such that they are not aligned along the detected fringe motion direction DFMD, and thus, they are not aligned with the interference bands 1235SIGD and interference bands 1235SIGL.

Figure 13D:
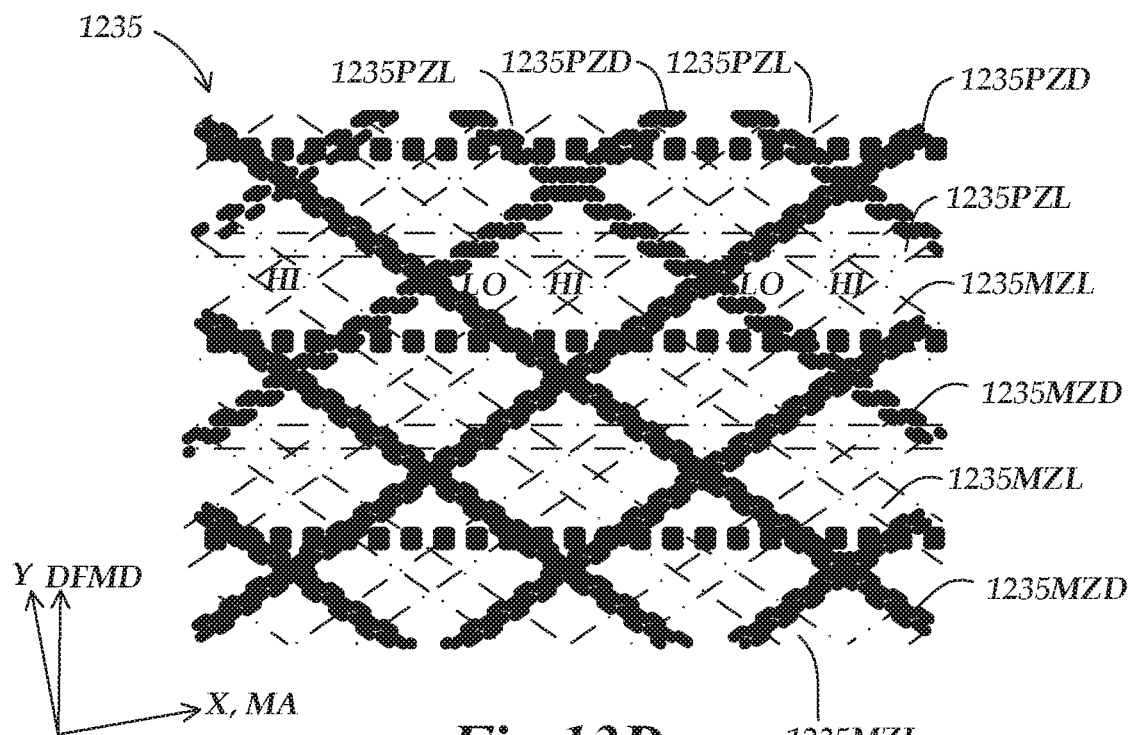
FIG. 13D is a schematic diagram representing a fourth view of scale light components that form a detector fringe pattern proximate to a photodetector configuration.

FIG. 13D is a schematic diagram representing a fourth view of scale light components that form a scale light pattern 1235 proximate to a photodetector configuration which is similar to the photodetector configuration 1260 in FIG. 12. More specifically, FIG. 13D shows a cross section of each of the portions PZ, MZ and SIG of the scale light 1235. If the pitch angle $\phi$ were zero, the interference bands of the portions PZ and MZ would not be oriented differently in angle relative to the detected fringe motion direction DFMD, but would instead be parallel to the interference bands 1235SIGD and 1235SIGL, which would result in variation in intensity between alternate interference bands high interference bands 1235SIGL of the portion SIG, which would cause short range errors in spatial phase displacement signals. However, as shown in FIG. 13D, in the case of a nonzero pitch angle $\phi$, low intensity interference bands 1235PZD and 1235MZD of the portions PZ and MZ overlap in low intensity regions LO and high intensity interference bands 1235PZL and 1235MZL overlap in high intensity regions HI. The regions LO and HI are aligned along a direction transverse to the detected fringe motion direction DFMD. The intensity of the 1235 in regions LO and HI averages out along the direction transverse to the detected fringe motion direction DFMD which suppresses variation in intensity between alternating fringes within the scale light 1235 along the detected fringe motion direction DFMD. This averaging reduces short range errors in spatial phase displacement signals which are caused by zero order scale light which interferes with the portion SIG of the scale light 1235.

In some implementations of the contamination and defect resistant optical encoder 1200, $\phi$ may be greater than 0.3 degrees and less than 2.0 degrees.

In some implementations of the contamination and defect resistant optical encoder 1200, each of the N spatial phase detectors may comprise an even number of scale light receptor areas.

In some implementations of the contamination and defect resistant optical encoder 1200, the structured illumination generating portion 1233 may comprise a first illumination source diffraction grating (e.g., the first illumination source diffraction grating 1040) and a second illumination source diffraction grating (e.g., the second illumination source diffraction grating 1050). The first illumination source diffraction grating may comprise first index grating bars arranged periodically at a first index pitch $P_1$ in a first index plane, wherein the first index grating bars are narrow along the measuring axis direction, and elongated along a first index grating bar direction which is transverse to the measuring axis direction and rotated by an angle $\psi_1$ with respect to the readhead plane RHP. The second illumination source diffraction grating may comprise second index grating bars arranged periodically at a second index pitch $P_2$ in a second index plane which is parallel to the first index plane, wherein the second index grating bars are narrow along the measuring axis direction, and elongated along a second index grating bar direction which is transverse to the measuring axis direction and rotated by an angle $\psi_2$ with respect to the readhead plane RHP. In some implementations (e.g., as previously described with respect to FIG. 10), the scale 1210 may comprise a scale grating which is a reflective grating, the source light path SOLP may be oriented at an angle V with respect to a direction normal to the scale plane SP, and the yaw angle $\psi_{SC}$ may satisfy equation (6). In some implementations, the light output by the light source 1230 may have a wavelength $\lambda$, a factor $\Omega$ may be defined by equation (5), and the angle $\psi_1$ and the angle $\psi_2$ may satisfy equation (7). In some implementations, the first illumination source light diffraction grating and the second illumination source light diffraction grating may be phase gratings. In some implementations, the detected fringe period PDF may be at least 40 micrometers.

FIG. 14 is a partially schematic isometric view of a first implementation of a contamination and defect resistant rotary optical encoder configuration 1400 which uses a cylindrical type rotary scale 1410 for providing displacement signals. The encoder configuration 1400 comprises the rotary scale 1410, an illumination source 1420, a structured illumination generating arrangement SIGA, and a detector arrangement 1465 including a photodetector configuration 1460. In the implementation shown in FIG. 14, the rotary scale 1410 comprises a transmissive grating. FIG. 14A is a diagram of a portion of the rotary scale grating 1410 of FIG. 14 showing additional details in a second illumination region IR2 on the rotary scale 1410. It will be appreciated that the pitch and angle of various grating bars and interference fringes shown in FIGS. 14 and 14A may not be represented to scale, for purposes of illustration, and should be interpreted in light of the associated description.

In certain respects, the rotary optical encoder configuration 1400 may be understood to operate based on certain fringe generation and detection concepts analogous to those previously outlined with reference to FIGS. 10-13D. Due to the use of analogous concepts, in the encoder configuration 1400, the periodic scale light pattern 1435 that is detected comprises a detector fringe pattern 1435', which includes bands (or fringes) that are oriented to extend over a relatively longer dimension along the rotary measuring axis direction MA, and that move transverse to the rotary measuring axis direction along a detected fringe motion direction DFMD during displacement of the rotary scale 1410. Thus, operation of the rotary optical encoder configuration 1400 may be largely understood by analogy with previous description and only certain aspects are described in detail below.

As shown in FIGS. 14 and/or 14A, the rotary scale 1410 extends along (or around) a rotary measuring direction $\theta$ about a rotary axis RA and rotates parallel to a rotary plane that is perpendicular to the rotary axis RA. The rotary scale 1410 comprises a rotary scale grating comprising scale grating bars GB arranged along the rotary measuring direction $\theta$ in or on a cylindrical rotary surface, wherein the scale grating bars GB are narrow along the rotary measuring direction $\theta$ and elongated along a rotary scale grating bar direction RSGBD transverse to the rotary measuring direction $\theta$, and are arranged periodically at a nominal scale pitch $P_{SF}$ along the rotary measuring direction $\theta$. The illumination source 1420 comprises a light source that outputs source light 1434 to a structured illumination generating arrangement SIGA. In various rotary encoder configurations disclosed herein the structured illumination generating arrangement SIGA comprises a first illumination region on the rotary scale, and a beam deflector configuration comprising at least first and second deflector elements, and a second illumination region on the rotary scale. In the particular implementation illustrated in FIG. 14, the structured illumination generating arrangement SIGA is configured to input the source light 1434 to the first illumination region IR1 on the rotary scale 1410, which diffracts the source light and outputs structured illumination light 1434' comprising diffracted beams (as represented by two lines with different dash styles in FIG. 14) along a light path LP to a beam deflector configuration BDC comprising a first mirror 1471 and a second mirror 1472. The beam deflector configuration BDC is configured to cause diffracted beams of the structured illumination light 1434' to cross over one another and transmit the resulting structured illumination light (that is, the diffracted beams) to overlap at a second illumination region IR2 on the rotary scale 1410. At the second illumination region IR2, the diffracted light beams of the structured illumination light 1434' interfere and form an illumination fringe pattern IFP proximate to the second illumination region IR2, such that the structured illumination light 1434' comprises the illumination fringe pattern IFP at the second illumination region IR2. The illumination fringe pattern IFP comprises fringes that are narrow along the rotary measuring direction θ and elongated along an illumination fringe direction IFD oriented transverse to the rotary measuring direction θ. The difference in angle between the illumination fringe direction IFD and a rotary scale grating bar direction RSGBD (shown in FIG. 14A) is configured to provide the periodic scale light pattern 1435 comprising the detector fringe pattern 1435' which includes fringes that have a relatively longer dimension along the rotary measuring axis direction MA, and that move along a detected fringe motion direction DFMD during displacement of the rotary scale 1410, as shown in FIG. 14.

As shown in FIG. 14, first mirror 1471 and second mirror 1472 reflect the diffracted beams of the structured illumination light 1434' along the general direction of the light path LP to the second illumination region IR2. In the particular implementation illustrated in FIG. 14, the first mirror 1471 and second mirror 1472 of the beam deflector configuration BDC are configured to receive respective beams of the diffracted source light that is output from the first illumination region IR1 and deflect those respective beams along converging beam paths that cross over proximate to the rotary axis RA such that they continue on along diverging beam paths, and to receive those respective beams and deflect them such that they continue on along converging beam paths to overlap and form the illumination fringe pattern IFP proximate to the second illumination region. In some implementations, the structured illumination light 1434' passes in free space between the first mirror 1471 and the second mirror 1472. In other implementations, the first mirror 1471 and the second mirror 1472 may be located at the surfaces of a monolithic optical material wherein the structured illumination light 1434' is reflected by internal reflections inside the monolithic optical material. In some implementations, the source light 1434 and the diffracted beams are nominally collimated (e.g., by including a collimation lens in the illumination source 1420). However, in other implementations, at least one of the illumination source 1420 and the beam deflector configuration BDC are configured such that the respective beams of the diffracted source light from the first illumination region IR1 are focused proximate to their crossover proximate to the rotary axis RA. In such implementations certain errors due to small component misalignments may be mitigated or eliminated. In some such implementations, a lens included in the illumination source 1420 may provide converging source light 1434 that is focused proximate to the rotary axis RA. In some such implementations, at least one of the beam deflector configuration BDC and/or the detector arrangement 1465 are configured such that the scale light from the second illumination region IR2 that forms the periodic scale light pattern 1435 comprising the detector fringe pattern 1435' is nominally collimated at the photodetector configuration 1460. For example, in one such implementation the detector arrangement 1465 may include a lens having characteristics complementary to the lens that focuses source light 1434 proximate to the rotary axis RA, to collimate the light included in the periodic scale light pattern 1435 before it reaches the photodetector 1460. It will be appreciated that in the implementation shown in FIG. 14, the beam deflector configuration BDC comprises first and second parallel planar mirrors 1471 and 1472 that are located on opposite sides of the rotary axis RA and that have respective surface planes that extend approximately parallel to a diameter of the cylindrical rotary scale 1410 that intersects the first and second illumination regions IR1 and IR2. The first and second mirrors 1471 and 1472 are each oriented to receive respective beams of the diffracted source light that is output from the first illumination region IR1. It will be appreciated that their surface planes are illustrated as rotated about the line illustrated as the light path LP, wherein this rotation produces the desired angle or direction of the illumination fringe direction IFD, according to previously outlined principles. It will be appreciated that the deflection provided by the mirrors 1471 and 1472 could alternatively be provided by various grating arrangements, instead of mirrors, in some implementations.

As previously outlined, the rotary scale 1410 is configured to input the illumination fringe pattern IFP at the second illumination region IR2 and output scale light in the form of a periodic scale light pattern 1435 that comprises a detector fringe pattern 1435' at the photodetector configuration 1460 of the detector arrangement 1465. The detector fringe pattern 1435' comprises periodic high and low intensity bands that extend over a relatively longer dimension along the rotary measuring direction θ and are relatively narrow and periodic with a detected fringe period PDF along the detected fringe motion direction DFMD transverse (e.g., orthogonal) to the rotary measuring direction θ.

As shown in detail in FIG. 14A, the rotary scale grating bar direction RSGBD of the grating bars GB is oriented at a nonzero yaw angle $\psi 1$ relative to a direction perpendicular to the measuring axis direction MA and along the rotary surface of the rotary scale 1410. Generally speaking, the structured illumination generating arrangement SIGA is configured such that the illumination fringe direction IFD of the fringe pattern 1435' proximate to the second illumination region IR2 on the rotary scale 1410 is oriented at a nominal fringe direction yaw angle $\psi 2$ that is rotated by a non-zero yaw difference angle YDA relative to the rotary scale grating bar direction RSGBD proximate to the second illumination region IR2 on the rotary scale 1410. According to the notation shown in FIG. 14A, YDA=($\psi 1-\psi 2$), where $\psi 2$ is measured in counterclockwise direction from a reference and therefore is considered a negative angle.

The detected fringe period PDF and the detected fringe motion direction DFMD are transverse to the rotary measuring direction θ and depend at least partially on the non-zero yaw difference angle YDA (e.g., on the nonzero yaw angle ψ1, in an analogous manner to that described with respect to FIG. 7.) The high and low intensity bands move along the detected fringe motion direction DFMD transverse to the rotary measuring direction θ as the rotary scale 1410 rotates about the rotary axis RA. The detector arrangement 1465 is configured to detect a displacement of the high and low intensity bands along the detected fringe motion direction DFMD transverse to the rotary measuring direction θ and provide respective spatial phase displacement signals that are indicative of the rotary scale displacement. In one implementation, the photodetector configuration 1460 in the detector arrangement 1465 is similar to the photodetector 560 and may be understood with reference to FIG. 6A and FIG. 6B. The photodetector configuration 1460 may comprise a set of N spatial phase detectors arranged periodically at a detector pitch PD (shown in FIG. 6A and FIG. 6B) along a detected fringe motion direction DFMD transverse to the rotary measuring direction. Each spatial phase detector may be configured to provide a respective spatial phase detector signal and at least a majority of the respective spatial phase detectors may extend over a relatively longer dimension along the rotary measuring direction and may be relatively narrow along the detected fringe motion direction transverse to the rotary measuring direction, and the set of N spatial phase detectors may be arranged in a spatial phase sequence along the detected fringe motion direction according to previously disclosed principles. In some implementations, there may be advantages in performance and/or economy if the detected fringe period PDF is at least 40 micrometers. In some implementations, there may be advantages in performance and/or economy if each of the N spatial phase detectors comprises an even number of scale light receptor areas.

In some implementations, EQUATION 6 may be adapted to a rotary optical encoder configuration such as the rotary optical encoder configuration 1400. In such a case, the rotary scale 1410 provides the equivalent of the first and second illumination source light diffraction gratings 540 and 550, where $P_1$ and $P_2$ are now equal to the scale pitch $P_{SF}$. In some implementations, it may be advantageous if ψ2 is equal to −ψ1. Since the light in the source light 1434 and the structured illumination light 1434' now only passes through two gratings, for the optical encoder configuration 1400, EQUATION 6 simplifies to provide an equation to relate the yaw angle ψ1 to the detected fringe period PDF:

$$\psi 1 = \sin^{-1}\left(\frac{P_{SF}}{4*PDF}\right) \quad (8)$$

Providing light in the source light 1434 and structured illumination light 1434' which is incident on the rotary scale 1410 twice (i.e., at the first illumination region IR1 and the second illumination region IR2) allows for higher resolution displacement measurements (that is, the resolution is "doubled" by providing a beam crossover as previously described in combination with having two diffractions on opposing sides of the rotary scale 1410) as well as for correction of rotational offset perpendicular to a line that passes through the first illumination region IR1 and the second illumination region IR2.

Figure 15:
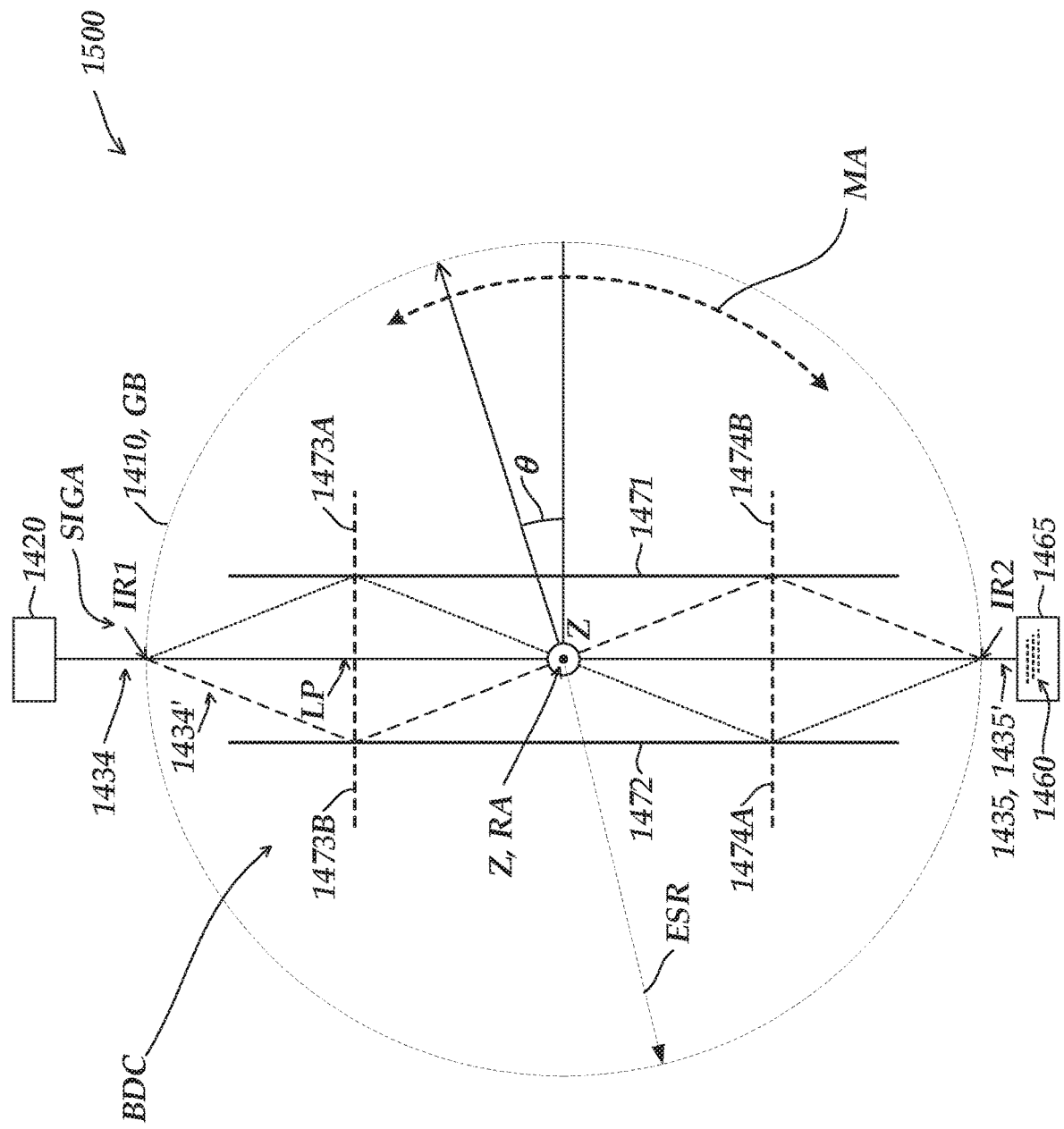
FIG. 15 is a partially schematic diagram viewed along the rotary axis direction representing certain aspects of a contamination and defect resistant rotary optical encoder configuration which may be similar or identical to the first implementation of a rotary optical encoder configuration shown in FIG. 14 in some implementations, including a representation of certain alternative elements.

FIG. 15 is a partially schematic diagram viewed along the rotary axis direction representing certain aspects of a contamination and defect resistant rotary optical encoder configuration 1500, which may be similar or identical to the first implementation of a rotary optical encoder configuration 1400 shown in FIG. 14 in some implementations, including a representation of certain alternative elements. Similar numbers in FIGS. 15 and 14 may be understood to designate similar or analogous elements unless otherwise indicated. Therefore, only certain different or alternative aspects of FIG. 15 are described here. FIG. 15 shows two different alternative implementations of the beam deflector configuration BDC. In particular, the first and second mirrors 1471 and 1472 provide one implementation of first and second deflector elements in the beam deflector configuration BDC, and the first and second deflector elements may comprise mirrors (1471 and 1472) or gratings configured to deflect the diffracted beams (shown by two lines with different dash styles) approximately as illustrated, as previously outlined with reference to FIG. 14. Alternatively to the first and second mirrors 1471 and 1472, the first and second gratings 1473 and 1474 provide a different implementation of first and second deflector elements in the beam deflector configuration BDC. In one implementation, the first grating 1473 may comprise a first transmissive grating configuration, and the second grating 1474 may comprise a second transmissive grating configuration which each deflect respective diffracted beams (shown by two lines with different dash styles) approximately as illustrated, according to known grating deflection principles. In various implementations, the gratings may provide focused and deflected beams, or collimated and deflected beams, according to previously outlined principles. In any case, suitable gratings may be determined by design, simulation, and/or experiment based on commercially available optical design programs and/or known grating design principles. It will be appreciated that in the grating 1473 (1474), the regions 1473A (1474A) and 1473B (1474B) may not be identical or continuous in some implementations. For example, the regions 1473A (1474A) and 1473B (1474B) may exhibit a mirror symmetry or the like (e.g., relative to the light path LP) in order to provide the desired deflection for their respective beams, in some implementations.

Figure 16:
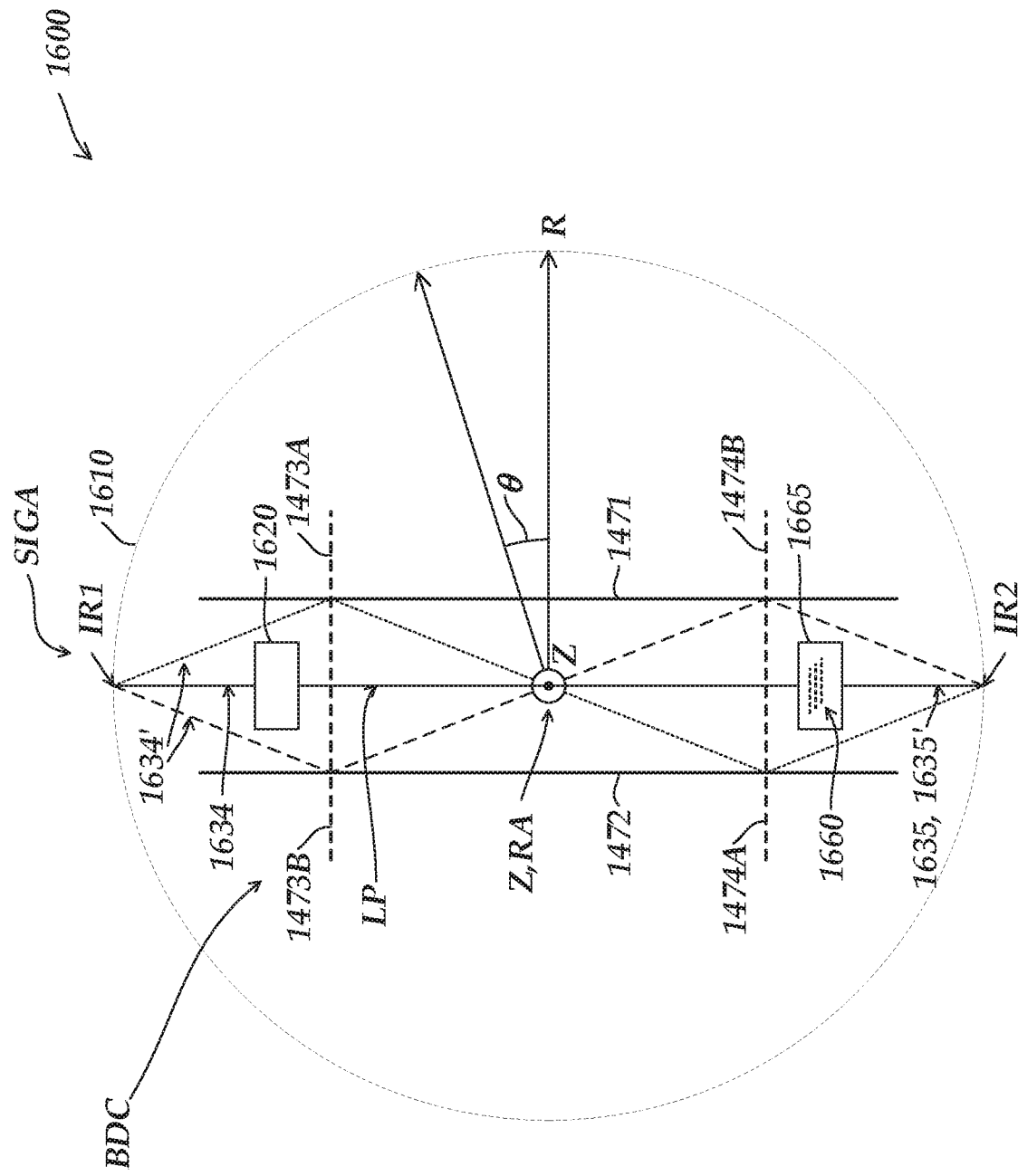
FIG. 16 is a partially schematic diagram viewed along the rotary axis direction representing certain aspects of a second implementation of a contamination and defect resistant rotary optical encoder configuration which uses a cylindrical type rotary scale for providing displacement signals, including a representation of certain alternative elements.

FIG. 16 is a partially schematic diagram viewed along the rotary axis direction representing certain aspects of a second implementation of a contamination and defect resistant rotary optical encoder configuration 1600 which uses a cylindrical type rotary scale 1610 that includes a reflective grating rather than a transmissive grating for providing displacement signals, including a representation of certain alternative elements. The encoder configuration 1600 is analogous to the encoder configuration 1500 shown in FIG. 15, except for the readily understood variations due to the use of the reflective grating on the rotary scale 1610. Similar numbers in FIGS. 16 and 15 (e.g., 16XX and 15XX, with similar suffixes) may be understood to designate similar or analogous elements unless otherwise indicated. It will be appreciated that the implementation shown in FIG. 16 allows the illumination source 1620, the beam deflector configuration BDC, and the detector arrangement 1665 to all be located on a single assembly located on the interior of the rotary scale 1610.

It will be appreciated that various encoder configurations disclosed above, the rotary scale is a cylindrical type scale having a nominally cylindrical rotary surface with the scale grating bars arranged thereon according to previously outlined principles. The first and second illumination regions IR1 and IR2 are located proximate to opposite ends of a diameter of the cylindrical rotary scale 1410, 1610, and the illumination source 1420, 1620 is configured to output the source light 1434, 1634 to the first illumination region IR1 along a line that intersects the first and second illumination regions IR1 and IR2, and the beam deflector configuration BDC is arranged in a volume bounded by a projection of the cylindrical rotary surface of the rotary scale 1410, 1610 along the direction of the rotary axis RA.

In various encoder configurations such as those disclosed above wherein the rotary scale is a cylindrical type scale, the illustrated track of scale grating bars GB around the rotary scale along with the associated optical components that are used to generate position signals from that track may be regarded as a first measurement channel. It will be appreciated that in such "cylindrical scale" configurations, it is particularly easy to add a second measurement channel that is similar or identical to the first measurement channel, if desired. For example, a second track of scale grating bars GB may be provided on a rotary scale, spaced apart along the direction of the rotary axis RA from first scale track. Some or all of the illumination source, beam deflection configuration, and detector arrangement may be duplicated for the second measurement channel or shared between the two measurement channels. The advantage of such a configuration is that a combination of the respective spatial phase displacement signals of the first and second measurement channels, or measurements derived therefrom, may be used to mitigate or compensate for potential misalignment errors that may otherwise arise in the individual spatial phase displacement signals or measurements derived from a single measurement channel. In one such implementation that is particularly advantageous, the first measurement channel includes the scale grating bars GB arranged with the yaw angle ψ1 along a first scale track on the rotary scale, and the second measurement channel includes the scale grating bars BG arranged with the opposite yaw angle −ψ1 along a second scale track on the rotary scale that is spaced apart along the direction of the rotary axis from first scale track. In some implementations, the first and second measurement channels may have different scale pitches, and the spatial phase difference between their signals may be used to indicate an absolute position measurement along the measurement axis, according to known methods. In some implementations, a single beam deflector configuration (e.g., two parallel mirrors) may be advantageously shared by the first and second measurement channels. In other implementations, the first and second measurement channels may have approximately orthogonal light paths, and a combination of their signals may be used to compensate for certain misalignment errors (e.g., offset in both X and Y or eccentricity errors).

Figure 17:
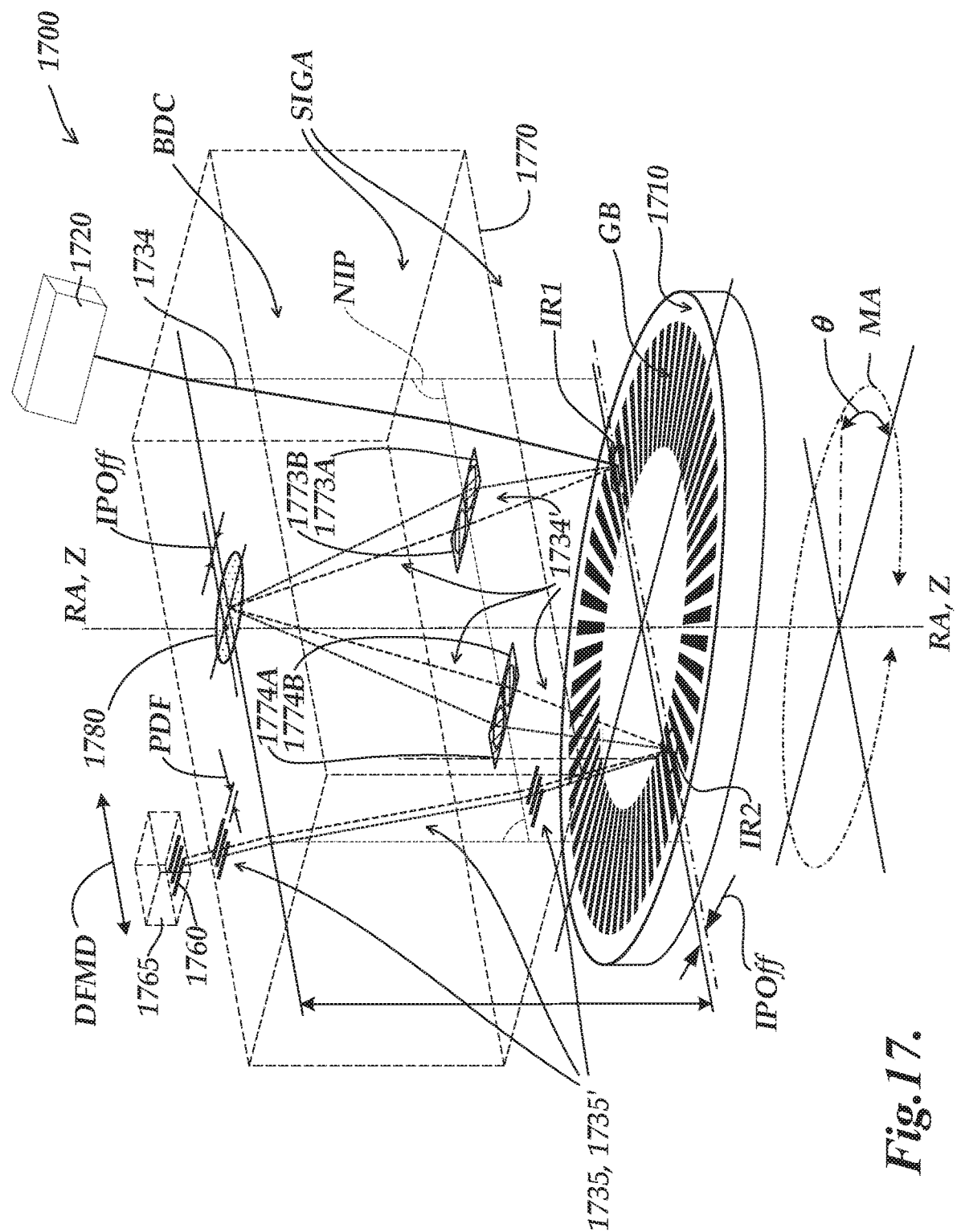
FIG. 17 is a partially schematic isometric view of a third implementation of a contamination and defect resistant rotary optical encoder configuration which uses a planar type rotary scale for providing displacement signals.
Figure 17A:
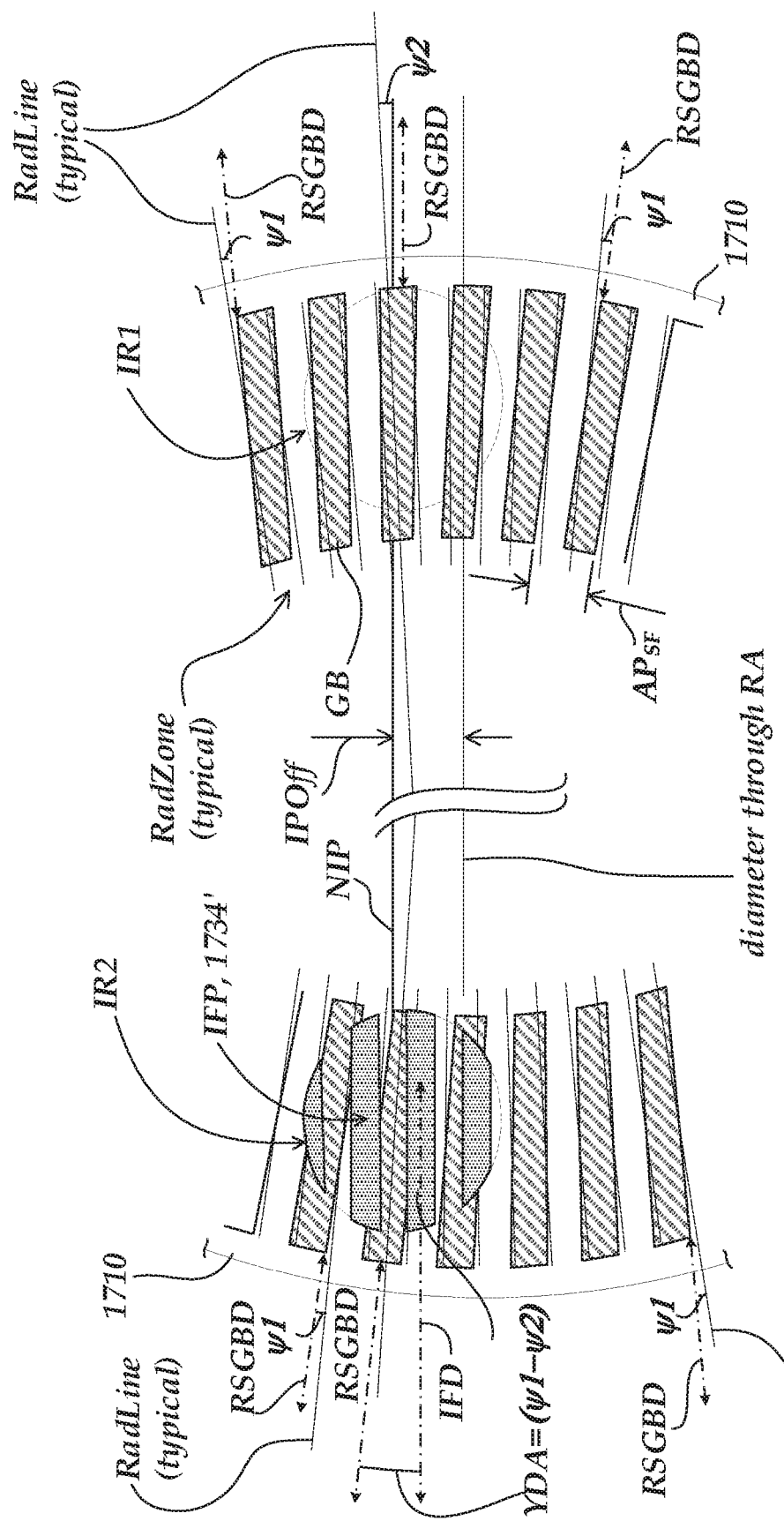
FIG. 17A is a diagram of portions of the rotary scale grating of FIG. 17 showing additional details in the first and second illumination regions IR1 and IR2 on that rotary scale.

FIG. 17 is a partially schematic isometric view of a third implementation of a contamination and defect resistant rotary optical encoder configuration 1700 which uses a planar type rotary scale 1710 for providing displacement signals. The encoder configuration 1700 comprises the rotary scale 1710, an illumination source 1720, a structured illumination generating arrangement SIGA, and a detector arrangement 1765 including a photodetector configuration 1760. In the implementation shown in FIG. 17, the rotary scale 1710 comprises a reflective grating. FIG. 17A is a diagram of portions of the rotary scale (grating) 1710 of FIG. 17 showing additional details in the first and second illumination regions IR1 and IR2 on the rotary scale 1710. It will be appreciated that the pitch and angle of various grating bars and interference fringes shown in FIGS. 17 and 17A may not be represented to scale, for purposes of illustration, and should be interpreted in light of the associated description.

In certain respects, the rotary optical encoder configuration 1700 may be understood to operate based on certain fringe generation and detection concepts analogous to those previously outlined with reference to FIGS. 10-14A. Due to the use of analogous concepts, in the encoder configuration 1700, the periodic scale light pattern 1735 that is detected comprises a detector fringe pattern 1735', which includes bands (or fringes) that are oriented to extend over a relatively longer dimension along the rotary measuring axis direction MA, and that move transverse to the rotary measuring axis direction along a detected fringe motion direction DFMD during displacement of the rotary scale 1710. Thus, despite the use of a planar type rotary scale 1710 instead of the cylindrical type rotary scale shown in FIG. 14, operation of the rotary optical encoder configuration 1700 may be largely understood by analogy with previous description (especially with respect to FIGS. 14 and 14A) and only certain aspects are described in detail below.

As shown in FIGS. 17 and/or 17A, the planar rotary scale 1710 may be circular, and extends along (or around) a rotary measuring direction θ about a rotary axis RA and rotates parallel to a rotary plane that is perpendicular to the rotary axis RA. The rotary scale 1710 comprises a rotary scale grating comprising reflective scale grating bars GB arranged along the rotary measuring direction θ in or on a planar rotary surface, wherein the scale grating bars GB are narrow along the rotary measuring direction θ and elongated along a rotary scale grating bar direction RSGBD transverse to the rotary measuring direction θ, and are arranged periodically at a nominal angular pitch $AP_{SF}$ along the rotary measuring direction θ. The illumination source 1720, a beam deflector configuration BDC of the structured illumination generating arrangement SIGA, and the detector arrangement 1765 including a photodetector configuration 1760 are all arranged on the same side of the rotary scale 1710. It will be understood that the nominal angular pitch $AP_{SF}$ may be converted to a "linear pitch" that is functionally comparable to the scale pitch $P_{SF}$ outlined above with reference to FIGS. 14 and 14A (e.g., with respect to various equations and relationships disclosed herein), by multiplying the angular pitch $AP_{SF}$ (in radians) by the nominal or average radius from the rotation axis RA to the center of the illumination regions IR1 and/or IR2.

The illumination source 1720 comprises a light source that outputs source light 1734 to a structured illumination generating arrangement SIGA. The structured illumination generating arrangement SIGA comprises a first illumination region IR1 on the rotary scale, and the beam deflector configuration BDC comprising first and second deflector elements 1773 and 1774, and a second illumination region IR2 on the rotary scale 1710. In the implementation illustrated in FIG. 17, the first and second illumination regions IR1 and IR2 are located proximate to opposite ends of a diameter of the rotary scale 1710 (although not perfectly aligned with that diameter). The illumination source 1720 is configured to output the source light 1734 to the first illumination region IR1 along a plane NIP that intersects the first and second illumination regions, and at an angle of incidence relative to the planar rotary surface in that plane. The structured illumination generating arrangement SIGA is configured to input the source light 1734 to the first illumination region IR1 on the rotary scale 1710, which reflects and diffracts the source light 1734 and outputs structured illumination light 1734' comprising diffracted beams (as represented by two lines with different dash styles in FIG. 17) along a light path to a beam deflector configuration BDC comprising first and second deflector elements 1773 and 1774, and a crossover region reflector 1780. The beam deflector configuration BDC is configured to cause diffracted beams of the structured illumination light 1734' to cross over one another and transmit the resulting structured illumination light (that is, the diffracted beams) to overlap at a second illumination region IR2 on the rotary scale 1710. In the implementation shown in FIG. 17, the first deflector element 1773 of the beam deflector configuration BDC is configured to receive respective beams of the source light that is diffracted and output from the first illumination region IR1, and deflect those respective beams along converging beam paths that cross over at the crossover region reflector 1780 proximate to the rotary axis RA. The crossover region reflector 1780 reflects those respective beams proximate to their crossover proximate to the rotary axis RA such that they continue on along diverging beam paths to the second deflector element 1774 of the beam deflector configuration BDC. The second deflector element 1774 receives those respective beams and deflects them such that they continue on along converging beam paths to overlap and form the illumination fringe pattern IFP proximate to the second illumination region IR2.

The second illumination region IR2 is configured to input the illumination fringe pattern IFP and output reflected scale light at an angle of incidence relative to the planar rotary surface of the rotary scale 1710 to form the periodic scale light pattern 1735 comprising the detector fringe pattern 1735' at the photodetector configuration 1760 of the detector arrangement 1765. In particular, at the second illumination region IR2, the diffracted light beams of the structured illumination light 1734' interfere and form an illumination fringe pattern IFP proximate to the second illumination region IR2, such that the structured illumination light 1734' comprises the illumination fringe pattern IFP at the second illumination region IR2. The illumination fringe pattern IFP comprises fringes that are narrow along the rotary measuring direction θ and elongated along an illumination fringe direction IFD oriented transverse to the rotary measuring direction θ. The difference in angle between the illumination fringe direction IFD and a rotary scale grating bar direction RSGBD (shown in FIG. 17A) is configured to provide the periodic scale light pattern 1735 comprising the detector fringe pattern 1735' which includes fringes that have a relatively longer dimension along the rotary measuring axis direction MA, and that move along a detected fringe motion direction DFMD during displacement of the rotary scale 1710, as shown in FIG. 17.

In the particular implementation illustrated in FIG. 17, the first and second deflector elements 1773 and 1774 comprise respective first and second pairs of transmissive gratings 1773A and 1773B, and 1774A and 1774B, described in greater detail below. The first pair of transmissive gratings 1773A and 1773B is arranged on a planar surface (e.g., of an optical block 1770) that is nominally parallel to the rotary plane, and the respective gratings of that pair are located to receive respective beams of the diffracted source light 1734' (also referred to as the structured illumination light 1734') that is reflected and output from the first illumination region IR1. It will be understood that the respective gratings of that pair each comprise grating bars that are configured (e.g., as described in greater detail below) to deflect their respective beams along converging beam paths that cross over proximate to the rotary axis RA, as outlined above. The crossover region reflector 1780 is located proximate to where the converging beam paths cross over near the rotary axis RA, and is configured to reflect those respective beams to continue on along diverging beam paths from the crossover region reflector 1780. The second pair of transmissive gratings 1774A and 1774B is also arranged on a planar surface that is nominally parallel to the rotary plane (e.g., coplanar with the first pair of transmissive gratings 1773A and 1773B), and the respective gratings of that pair are located to receive the respective beams along the diverging beam paths from the crossover region reflector 1780. The respective gratings of that pair each comprise grating bars that are configured (e.g., as described in greater detail below) to deflect those respective beams along converging beam paths to overlap and form the illumination fringe pattern IFP proximate to the second illumination region IR2, which then operates as outlined above.

In some implementations the crossover region reflector 1780 may be a plane mirror. In other implementations, the crossover region reflector 1780 comprises a curved surface (e.g., a curved surface with a radius of curvature that is on the order of its separation distance along the rotary axis RA from the planar surface of the rotary scale 1710 that includes the grating bars GB, in some implementations.) In some implementations, the source light 1734 and the diffracted beams are nominally collimated (e.g., by including a collimation lens in the illumination source 1720). However, in other implementations, at least one of the illumination source 1720 and the beam deflector configuration BDC are configured such that the respective beams of the diffracted source light from the first illumination region IR1 are focused proximate to their crossover proximate to the rotary axis RA, and most desirably at the crossover region reflector 1780. In such "beam focusing" implementations certain errors due to small component misalignments may be mitigated or eliminated.

In one such "beam focusing" implementation of the configuration shown in FIG. 17, in the first pair of transmissive gratings 1773A and 1773B, the respective gratings of that pair may each be configured to receive collimated light in their respective beams, and comprise curved grating bars that are configured to deflect their respective beams along converging beam paths that cross over proximate to the rotary axis and to focus those respective beams proximate to the rotary axis, and most desirably at the crossover region reflector 1780. In the second pair of transmissive gratings 1774A and 1774B, the respective gratings of that pair may each be configured to receive diverging light in their respective beams, and comprise curved grating bars that are configured to collimate and deflect the light in their respective beams to provide collimated light beams along converging beam paths to overlap and form the illumination fringe pattern IFP proximate to the second illumination region IR2. One implementation of such grating pairs is shown and described with reference to FIG. 18, below. In a different such "beam focusing" implementation, a lens included in the illumination source 1720 may provide converging source light 1734 that is focused proximate to the rotary axis RA. In some such implementations, at least one of the beam deflector configuration BDC and/or the detector arrangement 1765 are configured such that the scale light from the second illumination region IR2 that forms the periodic scale light pattern 1735 comprising the detector fringe pattern 1735' is nominally collimated at the photodetector configuration 1760. For example, in one such implementation the detector arrangement 1765 may include a lens having characteristics complementary to the lens that focuses source light 1734 proximate to the rotary axis RA, to collimate the light included in the periodic scale light pattern 1735 before it reaches the photodetector 1760.

As previously outlined, the rotary scale 1710 is configured to input the illumination fringe pattern IFP at the second illumination region IR2 and output scale light in the form of a periodic scale light pattern 1735 that comprises a detector fringe pattern 1735' at the photodetector configuration 1760 of the detector arrangement 1765. The detector fringe pattern 1735' comprises periodic high and low intensity bands that extend over a relatively longer dimension along the rotary measuring direction θ and are relatively narrow and periodic with a detected fringe period PDF along the detected fringe motion direction DFMD transverse to the rotary measuring direction θ.

As shown in detail in FIG. 17A, the rotary scale grating bar direction RSGBD of the grating bars GB is oriented at a nonzero yaw angle $\psi 1$ relative to a direction perpendicular to the measuring axis direction MA and along the rotary surface of the rotary scale 1710. In FIG. 17A, the direction perpendicular to the measuring axis direction MA is represented at the location of each grating bar GB by a radial line RadLine that is defined to extend radially from the rotation axis RA. Generally speaking, the structured illumination generating arrangement SIGA is configured such that the illumination fringe direction IFD of the fringe pattern 1735' proximate to the second illumination region IR2 on the rotary scale 1710 is oriented at a nominal fringe direction yaw angle that is rotated by a non-zero yaw difference angle YDA relative to the nominal or average rotary scale grating bar direction RSGBD proximate to the second illumination region IR2 on the rotary scale 1710. In the particular implementation shown in FIGS. 17 and 17A, the first and second illumination regions IR1 and IR2 are located proximate to opposite ends of a diameter through the rotary axis RA of the rotary scale, and the illumination source 1720 is configured to output the source light 1734 to the first illumination region IR1 along a nominal illumination plane NIP that is nominally normal to the planar rotary surface and nominally parallel to that diameter, and that is offset from that diameter by a nominal illumination plane offset IPOff. The first and second illumination regions IR1 and IR2 are each offset from that diameter by the nominal illumination plane offset IPOff. The nominal illumination plane offset IPOff is configured to align the nominal illumination plane NIP parallel to the nominal or average alignment of the scale grating bars GB in the first illumination region IR1. The scale grating bars GB have the nonzero yaw angle $\psi 1$ relative to the direction perpendicular to the measuring axis direction MA everywhere on the rotary scale 1710, including in the second illumination region IR2. The foregoing design principles result in the illumination fringe direction IFD being rotated at the non-zero yaw difference angle YDA relative to the nominal or average rotary scale grating bar direction RSGBD in the second illumination region IR2. According to the notation shown in FIG. 17A, YDA=($\psi 1$−$\psi 2$), where $\psi 2$ is measured in counterclockwise direction from a reference and therefore is considered a negative angle. In some such implementations, the non-zero yaw difference angle YDA is advantageously configured to be two times the nonzero yaw angle $\psi 1$.

In any case, the detected fringe period PDF and the detected fringe motion direction DFMD are transverse to the rotary measuring direction θ and depend at least partially on the non-zero yaw difference angle YDA (e.g., on the nonzero yaw angle $\psi 1$, in an analogous manner to that described with respect to FIG. 7.) The high and low intensity bands move along the detected fringe motion direction DFMD transverse to the rotary measuring direction θ as the rotary scale 1710 rotates about the rotary axis RA. The detector arrangement 1765 is configured to detect a displacement of the high and low intensity bands along the detected fringe motion direction DFMD transverse to the rotary measuring direction θ and provide respective spatial phase displacement signals that are indicative of the rotary scale displacement. In one implementation, the photodetector configuration 1760 in the detector arrangement 1765 is similar to the photodetector 560 and may be understood with reference to FIG. 6A and FIG. 6B. The photodetector configuration 1760 may comprise a set of N spatial phase detectors arranged periodically at a detector pitch PD (shown in FIG. 6A and FIG. 6B) along a detected fringe motion direction DFMD transverse to the rotary measuring direction. Each spatial phase detector may be configured to provide a respective spatial phase detector signal and at least a majority of the respective spatial phase detectors may extend over a relatively longer dimension along the rotary measuring direction and may be relatively narrow along the detected fringe motion direction transverse to the rotary measuring direction, and the set of N spatial phase detectors may be arranged in a spatial phase sequence along the detected fringe motion direction according to previously disclosed principles. In some implementations, there may be advantages in performance and/or economy if the detected fringe period PDF is at least 40 micrometers. In some implementations, there may be advantages in performance and/or economy if each of the N spatial phase detectors comprises an even number of scale light receptor areas.

In some implementations, EQUATION 6 may be adapted to a rotary optical encoder configuration such as the rotary optical encoder configuration 1700. In such a case, the rotary scale 1710 provides the equivalent of the first and second illumination source light diffraction gratings 540 and 550, where $P_1$ and $P_2$ are now equal to the effective scale pitch $P_{SF}$, which may be taken to be the angular pitch $AP_{SF}$ (in radians) multiplied by the nominal or average radius from the rotation axis RA to the center of the illumination regions IR1 and/or IR2, as previously outlined. Since the light in the source light 1734 and the structured illumination light 1734' now passes through two gratings similar to the optical encoder configuration 1400, for the optical encoder configuration 1700, EQUATION 6 simplifies to the previously explained EQUATION 8, to relate the yaw angle $\psi 1$ to the detected fringe period PDF.

Providing light in the source light 1734 and structured illumination light 1734' which is incident on the rotary scale 1710 twice (i.e., at the first illumination region IR1 and the second illumination region IR2) allows for a higher resolution displacement measurements as well as for correction of various potential misalignments in the rotary encoder configuration 1700.

FIG. 18 is a diagram schematically or qualitatively representing grating patterns usable as the first and second pairs of transmissive gratings 1773A and 1773B, and 1774A and 1774B, described previously with reference to FIG. 17. In the particular implementation shown in FIG. 18, in the first pair of transmissive gratings 1773A and 1773B, the respective gratings of that pair are each configured to receive collimated light in their respective beams, and comprise curved grating bars that are configured to deflect their respective beams along converging beam paths that cross over proximate to the rotary axis RA and to focus those respective beams proximate to the rotary axis RA, as shown in FIG. 17. In the second pair of transmissive gratings 1774A and 1774B, the respective gratings of that pair are each configured to receive diverging light in their respective beams, and comprise curved grating bars that are configured to collimate and deflect the light in their respective beams to provide collimated light beams along converging beam paths to overlap and form the illumination fringe pattern IFP proximate to the second illumination region IR2, as shown in FIG. 17. However, more generally, in various implementations, alternative gratings may be configured to provide collimated and deflected beams throughout, according to previously outlined principles. In any case, suitable gratings may be determined by design, simulation, and/or experiment based on commercially available optical design programs and/or known grating design principles.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All the U.S. patents and U.S. patent applications referred to in this specification are hereby incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A contamination and defect resistant rotary optical encoder configuration for providing displacement signals, including at least a first measurement channel comprising:

a rotary scale that extends along a rotary measuring direction about a rotary axis that is perpendicular to a rotary plane, the rotary scale comprising a rotary scale grating comprising scale grating bars arranged on a rotary surface that extends along the rotary measuring direction, wherein the scale grating bars are narrow along the rotary measuring direction and elongated along a rotary scale grating bar direction transverse to the rotary measuring direction, and are arranged periodically at a nominal scale pitch $P_{SF}$ along the rotary measuring direction;

an illumination source comprising a light source that outputs source light to a structured illumination generating arrangement, the structured illumination generating arrangement comprising a first illumination region on the rotary scale, a beam deflector configuration comprising at least first and second deflector elements, and a second illumination region on the rotary scale, wherein the structured illumination generating arrangement is configured to input the source light to the first illumination region which diffracts and outputs the source light as structured illumination light to the beam deflector configuration, which is configured to cause diffracted beams of the structured illumination light to cross over one another and transmit the resulting structured illumination light to the second illumination region on the rotary scale and form an illumination fringe pattern proximate to the second illumination region, the illumination fringe pattern comprising fringes that are narrow along the rotary measuring direction and elongated along an illumination fringe direction oriented transverse to the rotary measuring direction; and a detector arrangement including a photodetector configuration comprising a set of N spatial phase detectors arranged periodically at a detector pitch PD along a detected fringe motion direction that is transverse to the rotary measuring direction, wherein each spatial phase detector is configured to provide a respective spatial phase detector signal and at least a majority of the respective spatial phase detectors extend over a relatively longer dimension along the rotary measuring direction and are relatively narrow along the detected fringe motion direction transverse to the rotary measuring direction, and the set of N spatial phase detectors are arranged in a spatial phase sequence along the detected fringe motion direction;

wherein:

the rotary scale grating bar direction is oriented at a nonzero yaw angle $\psi$ on the rotary surface relative to a direction perpendicular to the measuring axis direction and along the rotary surface;

the structured illumination generating arrangement is configured such that the illumination fringe direction of the illumination fringe pattern proximate to the second illumination region on the rotary scale is oriented at a nominal fringe direction yaw angle that is rotated by a non-zero yaw difference angle YDA relative to the scale grating bar direction proximate to the second illumination region on the rotary scale;

the rotary scale grating is configured to input the illumination fringe pattern at the second illumination region and output scale light that forms a periodic scale light pattern comprising a detector fringe pattern at the photodetector configuration, the detector fringe pattern comprising periodic high and low intensity bands that extend over a relatively longer dimension along a direction parallel to the rotary measuring direction and are relatively narrow and periodic with a detected fringe period PDF along the detected fringe motion direction transverse to the rotary measuring direction;

the detected fringe period PDF and the detected fringe motion direction are transverse to the rotary measuring direction and depend at least partially on the nonzero yaw angle $\psi$;

the high and low intensity bands move along the detected fringe motion direction transverse to the rotary measuring direction as the scale grating rotates about the rotary axis; and the photodetector configuration is configured to detect a displacement of the high and low intensity bands along the detected fringe motion direction transverse to the rotary measuring direction and provide respective spatial phase displacement signals that are indicative of the rotary scale displacement.

2. The contamination and defect resistant rotary optical encoder configuration of claim 1, wherein the non-zero yaw difference angle YDA is nominally $-2\psi$.

3. The contamination and defect resistant rotary optical encoder configuration of claim 1, wherein each of the N spatial phase detectors comprises an even number of scale light receptor areas.

4. The contamination and defect resistant rotary optical encoder configuration of claim 1, wherein the detected fringe period PDF is at least 40 micrometers.

5. The contamination and defect resistant rotary optical encoder configuration of claim 1, wherein the yaw angle $\psi$ satisfies the relation:

$$\psi = \sin^{-1}\left(\frac{P_{SF}}{4 * PDF}\right).$$

6. The contamination and defect resistant rotary optical encoder configuration of claim 1, wherein:
the rotary scale is a cylindrical type rotary scale having a nominally cylindrical rotary surface with the scale grating bars arranged thereon; and
the first and second illumination regions are located proximate to opposite ends of a diameter of the cylindrical type rotary scale and the illumination source is configured to output the source light to the first illumination region along a line that intersects the first and second illumination regions, and the beam deflector configuration is arranged in a volume bounded by a projection of the cylindrical rotary surface along the direction of the rotary axis.

7. The contamination and defect resistant rotary optical encoder configuration of claim 6, wherein:
the beam deflector configuration is configured to receive respective beams of the diffracted source light that is output from the first illumination region and deflect those respective beams along converging beam paths that cross over proximate to the rotary axis such that they continue on along diverging beam paths, and to receive those respective beams and deflect them such that they continue on along converging beam paths to overlap and form the illumination fringe pattern proximate to the second illumination region.

8. The contamination and defect resistant rotary optical encoder configuration of claim 7, wherein:
at least one of the illumination source and the beam deflector configuration are configured such that the respective beams of the diffracted source light are focused proximate to their crossover proximate to the rotary axis; and
at least one of the beam deflector configuration and the detector arrangement are configured such that the output reflected scale light that forms the periodic scale light pattern comprising the detector fringe pattern is nominally collimated at the photodetector configuration.

9. The contamination and defect resistant rotary optical encoder configuration of claim 7, wherein:
the beam deflector configuration comprises first and second parallel planar mirrors or gratings that are located on opposite sides of the rotary axis and that have respective surface planes that extend parallel to a diameter of the cylindrical rotary scale that intersects the first and second illumination regions, and that are each oriented to receive respective beams of the diffracted source light that is output from the first illumination region; and
the first and second parallel planar mirrors or gratings are furthermore configured to receive the respective beams of the diffracted source light that is output from the first illumination region and deflect those respective beams along converging beam paths that cross over proximate to the rotary axis such that they continue on along diverging beam paths, and to receive those respective beams and deflect them such that they continue on along converging beam paths to overlap and form the illumination fringe pattern proximate to the second illumination region.

10. The contamination and defect resistant rotary optical encoder configuration of claim 7, further including at least a second measurement channel conforming to the claimed configuration of the first measurement channel, wherein a combination of the respective spatial phase displacement signals of the first and second measurement channels, or measurements derived therefrom, mitigates or compensates for potential misalignment errors that may otherwise arise in their individual spatial phase displacement signals or measurements derived therefrom.

11. The contamination and defect resistant rotary optical encoder configuration of claim 10, wherein:
the first measurement channel includes the scale grating bars arranged with the yaw angle $\psi$ along a first scale track on the rotary scale;
the second measurement channel includes the scale grating bars arranged with a yaw angle $-\psi$ along a second scale track on the rotary scale that is spaced apart along the direction of the rotary axis from first scale track; and
a single beam deflector configuration is shared by the first and second measurement channels.

12. The contamination and defect resistant rotary optical encoder configuration of claim 1, wherein:
the rotary scale is a planar circular type rotary scale having a planar rotary surface with reflective scale grating bars arranged at a constant angular pitch $AP_{SF}$ thereon;
the illumination source, the beam deflector configuration, and the detector arrangement of the first measuring channel are all arranged on the same side of the rotary scale;
the first and second illumination regions are located proximate to opposite ends of a diameter of the rotary scale, and the illumination source is configured to output the source light to the first illumination region along a plane that intersects the first and second illumination regions, and at an angle of incidence relative to the planar rotary surface in that plane;
the beam deflector configuration is configured to receive respective beams of the diffracted source light that is reflected and output from the first illumination region and deflect those respective beams along converging beam paths that cross over proximate to the rotary axis, and to reflect those respective beams proximate to their crossover proximate to the rotary axis such that they continue on along diverging beam paths, and to receive those respective beams and deflect them such that they continue on along converging beam paths to overlap and form the illumination fringe pattern proximate to the second illumination region; and
the second illumination region is configured to input the illumination fringe pattern and output reflected scale light at an angle of incidence relative to the planar rotary surface to form the periodic scale light pattern comprising the detector fringe pattern at the photodetector configuration.

13. The contamination and defect resistant rotary optical encoder configuration of claim 12, wherein:
at least one of the illumination source and the beam deflector configuration are configured such that the respective beams of the diffracted source light are focused proximate to their crossover proximate to the rotary axis; and
at least one of the beam deflector configuration and the detector arrangement are configured such that the output reflected scale light that forms the periodic scale light pattern comprising the detector fringe pattern is nominally collimated at the photodetector configuration.

14. The contamination and defect resistant optical encoder configuration of claim 12, wherein:
   the beam deflector configuration comprises a first and second pairs of transmissive gratings and a crossover region reflector;
   the first pair of transmissive gratings is arranged on a planar surface that is nominally parallel to the rotary plane, and the respective gratings of that pair are located to receive respective beams of the diffracted source light that is reflected and output from the first illumination region, and the respective gratings of that pair each comprise grating bars that are configured to deflect their respective beams along converging beam paths that cross over proximate to the rotary axis;
   the crossover region reflector is located proximate to where the converging beam paths cross over near the rotary axis, and is configured to reflect those respective beams to continue on along diverging beam paths from the crossover region reflector; and
   the second pair of transmissive gratings is arranged on a planar surface that is nominally parallel to the rotary plane, and the respective gratings of that pair are located to receive respective beams along the diverging beam paths, and the respective gratings of that pair each comprise grating bars that are configured to deflect those respective beams along converging beam paths to overlap and form the illumination fringe pattern proximate to the second illumination region.

15. The contamination and defect resistant rotary optical encoder configuration of claim 14, wherein:
   in the first pair of transmissive gratings, the respective gratings of that pair are each configured to receive collimated light in their respective beams, and comprise curved grating bars that are configured to deflect their respective beams along converging beam paths that cross over proximate to the rotary axis and to focus those respective beams proximate to the rotary axis; and
   in the second pair of transmissive gratings, the respective gratings of that pair are each configured to receive diverging light in their respective beams, and comprise curved grating bars that are configured to collimate and deflect the light in their respective beams to provide collimated light beams along converging beam paths to overlap and form the illumination fringe pattern proximate to the second illumination region.

16. The contamination and defect resistant rotary optical encoder configuration of claim 14, wherein the crossover region reflector comprises a curved surface.

17. The contamination and defect resistant rotary optical encoder configuration of claim 12, wherein:
   the first and second illumination regions are located proximate to opposite ends of a diameter through the rotary axis of the rotary scale, and the illumination source is configured to output the source light to the first illumination region along a nominal illumination plane that is nominally normal to the planar rotary surface and nominally parallel to that diameter, and that is offset from that diameter by a nominal illumination plane offset;
   the first and second illumination regions are each offset from that diameter by the nominal illumination plane offset; and
   and the nominal illumination plane offset is configured to align the nominal illumination plane parallel to the nominal or average alignment of the scale grating bars in the second illumination region that have the nonzero yaw angle relative to the direction perpendicular to the measuring axis direction and along the rotary surface, which results in the nominal fringe direction yaw angle being rotated at the non-zero yaw difference angle YDA relative to the nominal illumination plane in the second illumination region.

18. The contamination and defect resistant rotary optical encoder configuration of claim 17, wherein the non-zero yaw difference angle YDA is configured to be two times the nonzero yaw angle $\psi$.

19. The contamination and defect resistant rotary optical encoder configuration of claim 1, wherein the beam deflector configuration comprises a transparent optical block, and the deflector elements of the beam deflector configuration comprise surfaces of the transparent optical block, or elements formed on or attached to surfaces of the transparent optical block.

* * * * *

UNITED STATES PATENT AND TRADEMARK OFFICE
CERTIFICATE OF CORRECTION

PATENT NO. : 10,648,838 B2
APPLICATION NO. : 16/413521
DATED : May 12, 2020
INVENTOR(S) : Joseph Daniel Tobiason It is certified that error appears in the above-identified patent and that said Letters Patent is hereby corrected as shown below:

On the Title Page

<u>Under item (54) Title and in the Specification at Column 1, Lines 1-7:</u>
"CONTAMINATION AND DEFECT RESISTANT ROTARY OPTICAL ENCODER CONFIGURATION INCLUDING A ROTARY SCALE WITH YAWED SCALE GRATING BARS AND STRUCTURED ILLUMINATION GENERATING ARRANGEMENT WITH A BEAM DEFLECTOR CONFIGURATION"
Should read:
--CONTAMINATION AND DEFECT RESISTANT ROTARY OPTICAL ENCODER CONFIGURATION INCLUDING A ROTARY SCALE WITH YAWED SCALE GRATING BARS AND A STRUCTURED ILLUMINATION GENERATING ARRANGEMENT WITH A BEAM DEFLECTOR CONFIGURATION--

Signed and Sealed this
Twenty-fifth Day of August, 2020

Andrei Iancu
*Director of the United States Patent and Trademark Office*